US012563632B2

(12) United States Patent
Gupta et al.

(10) Patent No.: US 12,563,632 B2
(45) Date of Patent: Feb. 24, 2026

(54) EXTENDED DISCONTINUOUS RECEPTION (eDRX) FOR REDUCED CAPABILITY (REDCAP) USER EQUIPMENT

(71) Applicant: Apple Inc., Cupertino, CA (US)

(72) Inventors: Vivek G. Gupta, San Jose, CA (US); Naveen Kumar Palle Venkata, San Diego, CA (US); Sudeep Manithara Vamanan, Nuremberg (DE)

(73) Assignee: Apple Inc., Cupertino, CA (US)

( * ) Notice: Subject to any disclaimer, the term of this patent is extended or adjusted under 35 U.S.C. 154(b) by 650 days.

(21) Appl. No.: 17/862,223

(22) Filed: Jul. 11, 2022

(65) Prior Publication Data

US 2023/0037839 A1    Feb. 9, 2023

Related U.S. Application Data

(60) Provisional application No. 63/229,476, filed on Aug. 4, 2021.

(51) Int. Cl.
| | |
|---|---|
| *H04W 76/28* | (2018.01) |
| *H04W 8/24* | (2009.01) |
| *H04W 60/04* | (2009.01) |
| *H04W 76/27* | (2018.01) |

(52) U.S. Cl.
CPC ............. *H04W 76/28* (2018.02); *H04W 8/24* (2013.01); *H04W 60/04* (2013.01); *H04W 76/27* (2018.02)

(58) Field of Classification Search
CPC ....... H04W 76/28; H04W 76/27; H04W 8/24; H04W 60/04
See application file for complete search history.

(56) References Cited

U.S. PATENT DOCUMENTS

| | | | | | |
|---|---|---|---|---|---|
| 2019/0289571 | A1* | 9/2019 | Park | ...................... | H04W 60/00 |
| 2020/0128484 | A1* | 4/2020 | Su | ......................... | H04W 48/20 |
| 2020/0396673 | A1* | 12/2020 | Tiwari | ................. | H04W 12/06 |
| 2021/0250890 | A1* | 8/2021 | Won | ...................... | H04W 48/16 |
| 2023/0319841 | A1* | 10/2023 | Ratasuk | ............... | H04L 1/0063 |
| | | | | | 370/329 |
| 2023/0403757 | A1* | 12/2023 | Kong | .................... | H04W 76/27 |
| 2024/0147571 | A1* | 5/2024 | Koskinen | ............. | H04W 76/27 |

(Continued)

FOREIGN PATENT DOCUMENTS

| | | | | |
|---|---|---|---|---|
| CN | 108370604 A | 8/2018 | | |
| CN | 202011148865.4 | * 10/2020 | ........... | H04W 76/27 |

(Continued)

OTHER PUBLICATIONS

3GPP TR 23.724 V16.1.0 (Jun. 2019) Study on Cellular Internet of Things (CIoT) support and evolution for the 5G System (Year: 2019).*

(Continued)

*Primary Examiner* — Sudesh M. Patidar
(74) *Attorney, Agent, or Firm* — Kilpatrick Townsend & Stockton LLP

(57) ABSTRACT

The present application relates to supporting extended discontinuous reception (eDRX) by a reduced capability user equipment (RedCap UE). A user equipment (UE) indicates to a network that the UE is operating as a RedCap UE and requests an eDRX configuration. In response, the network selects one or more values for the eDRX and sends such value(s) to the UE.

20 Claims, 15 Drawing Sheets

700

(56) References Cited

U.S. PATENT DOCUMENTS

| | | | | |
|---|---|---|---|---|
| 2024/0171968 A1* | 5/2024 | Starsinic | ............. | H04L 65/1073 |
| 2024/0179792 A1* | 5/2024 | Höglund | ............... | H04W 76/28 |

FOREIGN PATENT DOCUMENTS

| | | |
|---|---|---|
| CN | 112020879 A | 12/2020 |
| WO | 2021066414 A1 | 4/2021 |

OTHER PUBLICATIONS

Hong et al, GUTI Reallocation Demystified: Cellular Location Tracking with Changing Temporary Identifier Retrieved from https://www.ndss-symposium.org/wp-content/uploads/2018/02/ndss2018_02A-4_Hong_paper.pdf Feb. 2018 (Year: 2018).*

Huawei, HiSilicon Discussion on NAS impact of extended DRX for RedCap UEs, 3GPP TSG CT WG1 Meeting #130-e C1-213537 May 2021 (Year: 2021).*

3GPP TR 38.875 V17.0.0 (Mar. 2021) 3rd Generation Partnership Project; Technical Specification Group Radio Access Network; Study on support of reduced capability NR devices Mar. 2021 (Year: 2021).*

3rd Generation Partnership Project; Technical Specification Group Services and System Aspects; System architecture for the 5G System (5GS); Stage 2 (Release 16), 3GPP TS 23.501 V16.9.0, Jun. 2021, 452 pages.

3rd Generation Partnership Project; Technical Specification Group Core Network and Terminals; Non-Access- Stratum (NAS) protocol for 5G System (5GS); Stage 3 (Release 16), 3GPP TS 24.501 V16.9.0, Jun. 2021, 730 pages.

3rd Generation Partnership Project; Technical Specification Group Radio Access Network; NR; Radio Resource Control (RRC) protocol specification (Release 16), 3GPP TS 38.331 V16.5.0, Jun. 2021, 959 pages.

"Discussion on NAS Impact of Extended DRX for RedCap UEs" , 3GPP TSG CT WG1 Meeting #130-e, C1-213537 , May 20-28, 2021 , 5 pages.

"Standardization Framework and Design Principles for NR RedCap Devices" , Qualcomm Incorporated, 3GPP TSG-RAN WG1 Meeting #102, R1-2006814 , Aug. 17-28, 2020 , 8 pages.

"Summary of Offline 109—[Redcap] eDRX Cycles" , CATT, 3GPP TSG-RAN WG2 Meeting #113 Electronic, R2-2102019 , Jan. 25-Feb. 5, 2021 , 30 pages.

EP22182900.5 , "Extended European Search Report", , 13 pages.

EP22182900.5 , "Partial European Search Report", , 11 pages.

Office Action issued in European Application No. EP22182900.5, dated Sep. 12, 2024 in 4 pages.

"EDRX for Reduced Capability UEs", 3rd Generation Partnership Project Technical Specification Group-Radio Access Network Working Group 2 Meeting #111-e, R2-2007494, Aug. 17-28, 2020, 4 pages.

Chinese Patent Application No. 202210855899.X, "Office Action", Feb. 22, 2025, 14 pages.

"Discussion on Architecture Impact for Redcap", 3Generation Partnership Project Technical Specification Group-Working Group SA2 Meeting #145 e-meeting, S2-2104329, May 17-28, 2021, 3 pages.

"Discussion on Redcap eDRX cycles", R3-212060, 3Generation Partnership Project Technical Specification Group-Radio Access Network Working Group3 Meeting #112-e, May 17-28, 2021, 3 pages.

European Patent Application No. 22182900.5, "Office Action", Jun. 4, 2025, 8 pages.

Chinese Patent Application No. 202210855899.X, "Office Action", Jul. 1, 2025, 4 pages.

European Patent Applicaiton No. 22182900.5, "Office Action", Jun. 4, 2025, 8 pages.

Indian Patent Applicaiton No. 202214039740, "First Examination Report", Jul. 1, 2025, 6 pages.

Korean Patent Application No. 10-2022-0087412, "Office Action", Jun. 19, 2025, 9 pages.

* cited by examiner

700

Figure 11:
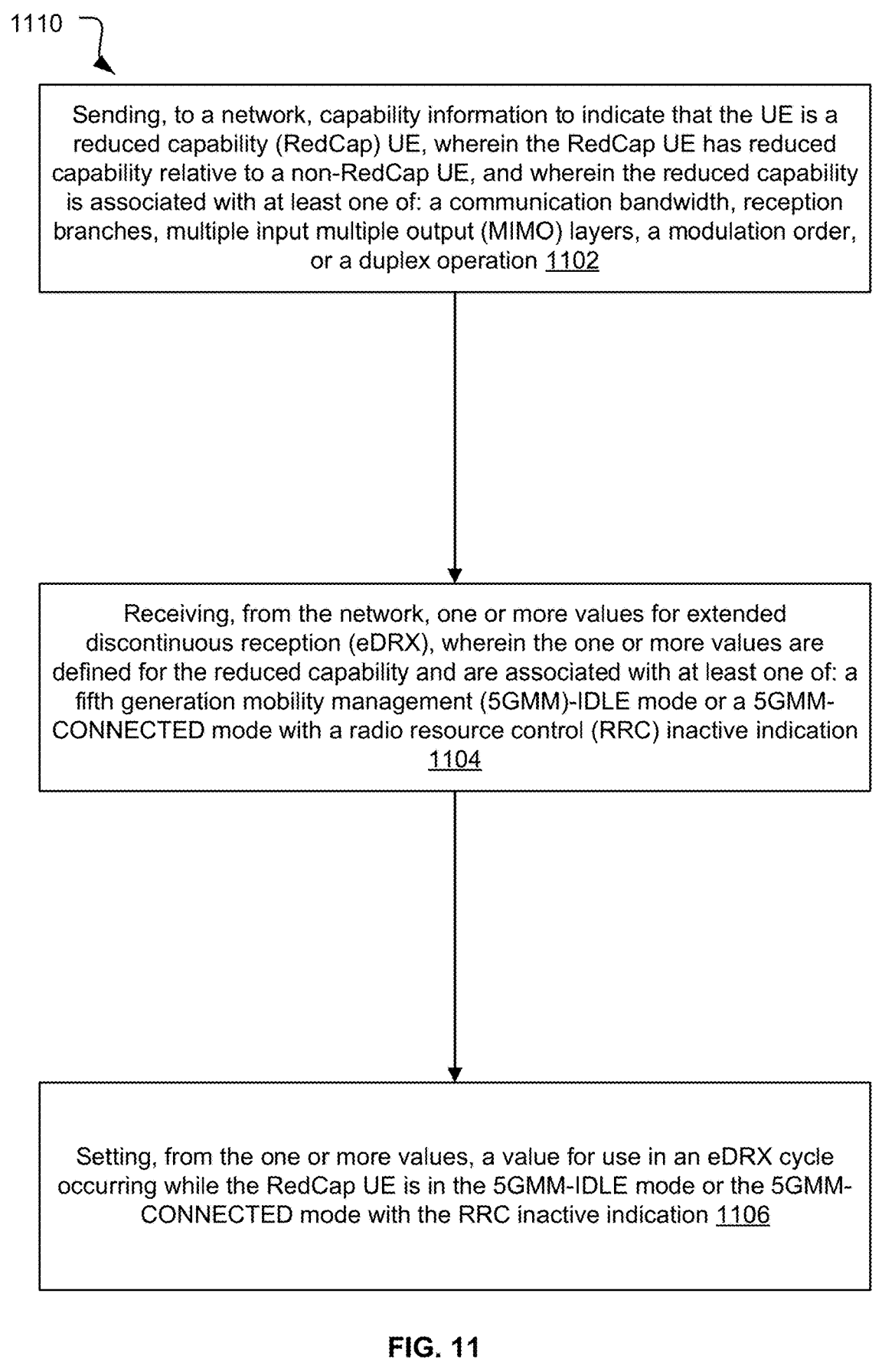

1110

Sending, to a network, capability information to indicate that the UE is a reduced capability (RedCap) UE, wherein the RedCap UE has reduced capability relative to a non-RedCap UE, and wherein the reduced capability is associated with at least one of: a communication bandwidth, reception branches, multiple input multiple output (MIMO) layers, a modulation order, or a duplex operation 1102

Receiving, from the network, one or more values for extended discontinuous reception (eDRX), wherein the one or more values are defined for the reduced capability and are associated with at least one of: a fifth generation mobility management (5GMM)-IDLE mode or a 5GMM-CONNECTED mode with a radio resource control (RRC) inactive indication 1104

Setting, from the one or more values, a value for use in an eDRX cycle occurring while the RedCap UE is in the 5GMM-IDLE mode or the 5GMM-CONNECTED mode with the RRC inactive indication 1106

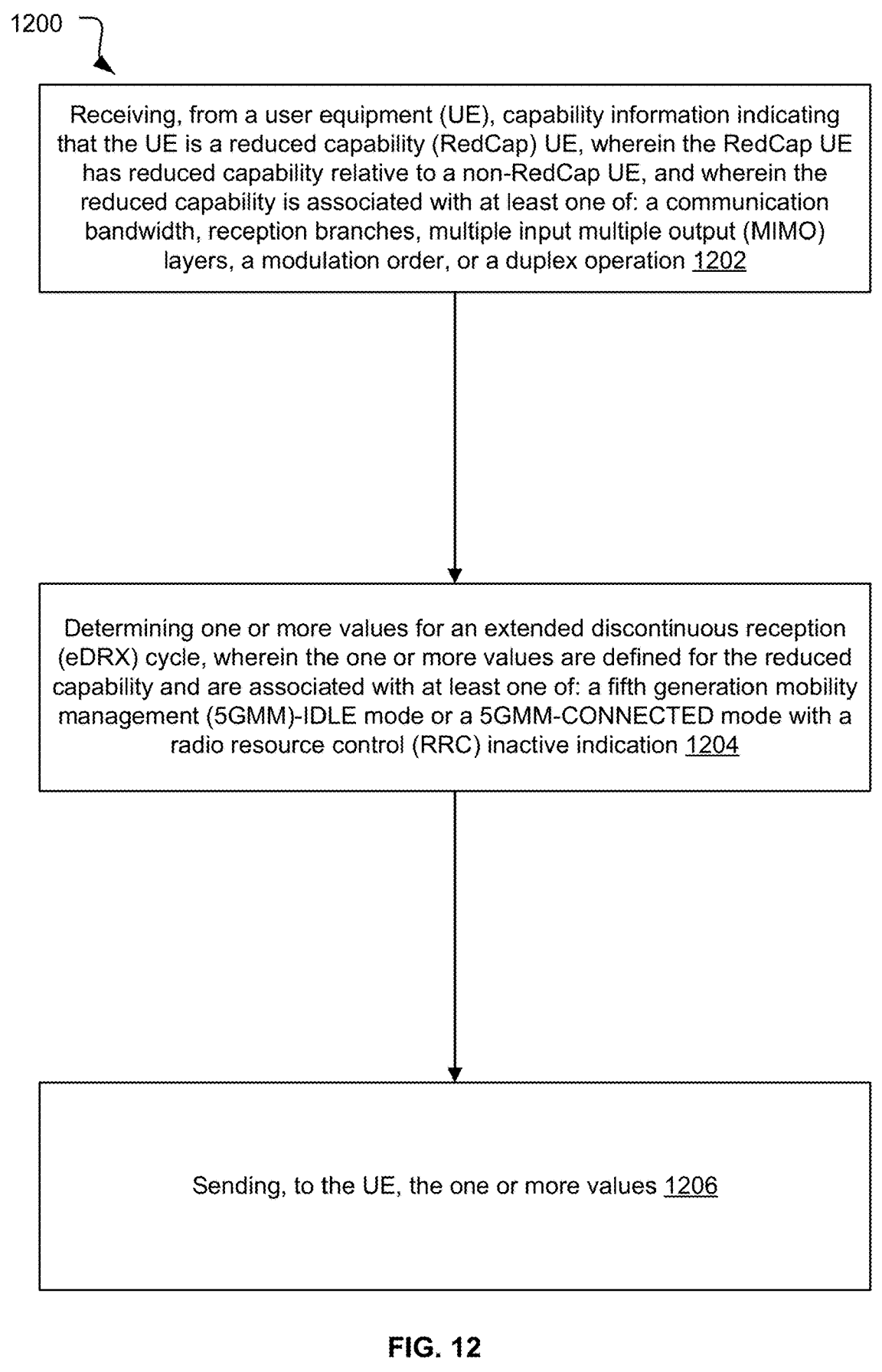

Receiving, from a user equipment (UE), capability information indicating that the UE is a reduced capability (RedCap) UE, wherein the RedCap UE has reduced capability relative to a non-RedCap UE, and wherein the reduced capability is associated with at least one of: a communication bandwidth, reception branches, multiple input multiple output (MIMO) layers, a modulation order, or a duplex operation 1202

Determining one or more values for an extended discontinuous reception (eDRX) cycle, wherein the one or more values are defined for the reduced capability and are associated with at least one of: a fifth generation mobility management (5GMM)-IDLE mode or a 5GMM-CONNECTED mode with a radio resource control (RRC) inactive indication 1204

Sending, to the UE, the one or more values 1206

FIG. 12

EXTENDED DISCONTINUOUS RECEPTION (eDRX) FOR REDUCED CAPABILITY (REDCAP) USER EQUIPMENT

CROSS-REFERENCE TO RELATED APPLICATION

This application claims the benefit of U.S. Provisional Patent Application No. 63/229,476, filed on Aug. 4, 2021, which is herein incorporated by reference in its entirety for all purposes.

BACKGROUND

Third Generation Partnership Project (3GPP) Technical Specifications (TSs) define standards for wireless networks. These TSs define operation of 5G systems (5GS) that provide data connectivity and services.

BRIEF DESCRIPTION OF THE DRAWINGS

FIG. 11 illustrates an example of an operational flow/algorithmic structure for indicating reduced capability and associated eDRX cycle values, in accordance with some embodiments.

FIG. 12 illustrates another example of an operational flow/algorithmic structure for indicating reduced capability and associated eDRX cycle values, in accordance with some embodiments.

DETAILED DESCRIPTION

Figure 1:
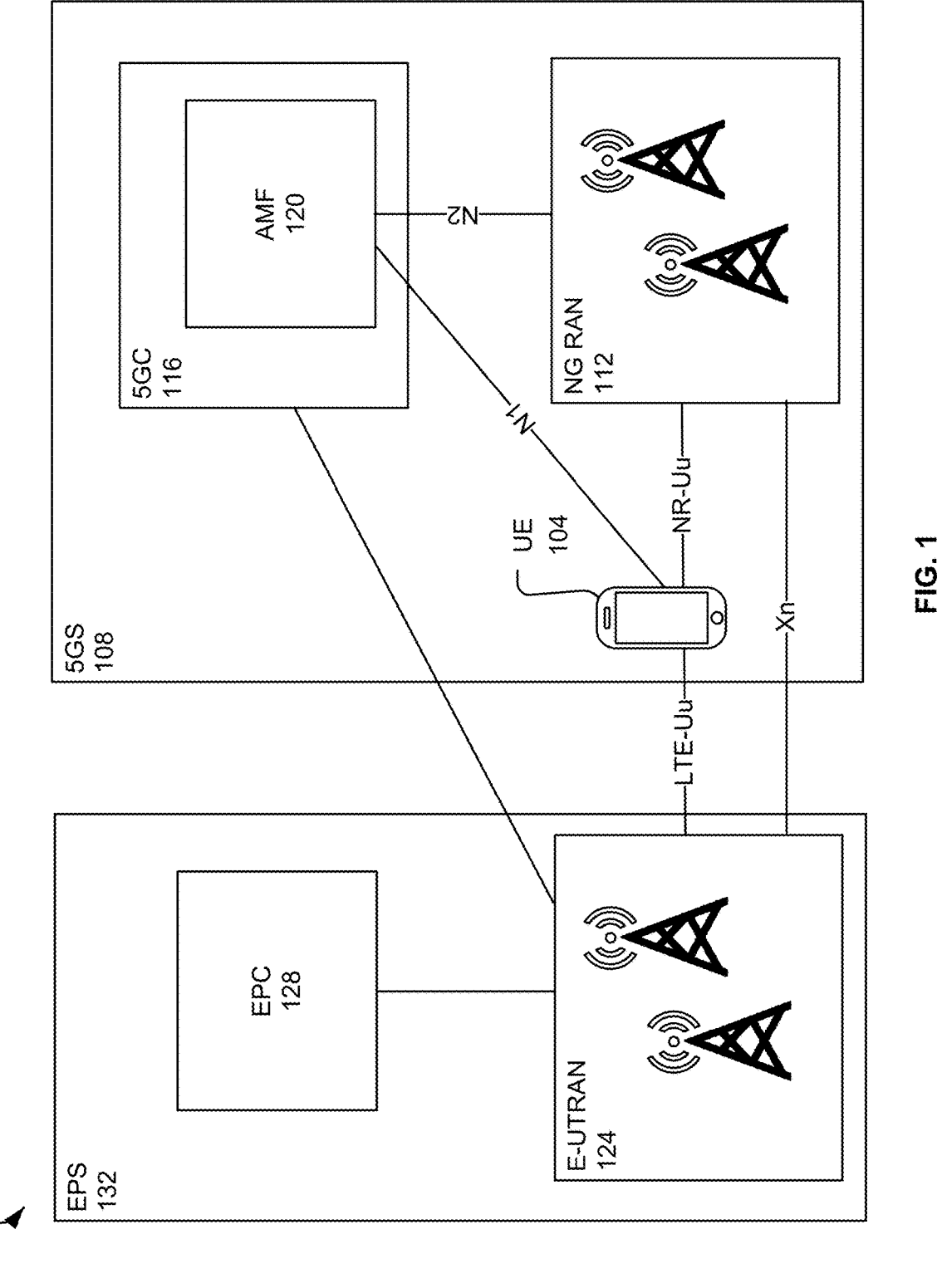
FIG. 1 illustrates a network environment, in accordance with some embodiments.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrase "A or B" means (A), (B), or (A and B).

Generally, a user equipment (UE) can communicate information with a network. The amount of uplink (UL) traffic and downlink (DL) traffic from and to the UE can vary based on a number of factors including, for example, the UE type. Optimizations can be performed based on the UE type and expected traffic amounts. In an example, the UE type is a reduced capability (RedCap) UE type, where the UE has reduced capability relative to a non-RedCap UE. The reduced capability relates to a communication bandwidth, reception branches, multiple input multiple output (MIMO) layers, a modulation order, and/or a duplex operation of the RedCap UE. The expected traffic amount for a RedCap UE is expected to be relatively lower than that of a non-RedCap UE, and the RedCap UE is expected to have a lower battery consumption than the non-RedCap UE.

To improve the battery consumption of the RedCap UE, extended discontinuous reception (eDRX) can be used. In an example, values for the eDRX cycle can be defined for the RedCap UE type and are associated with a fifth generation mobility management (5GMM)-IDLE mode or a 5GMM-CONNECTED mode with a radio resource control (RRC) inactive indication. These values can be defined along with non-access stratum (NAS) message retransmission timers and NAS periodic registration timers such that the eDRX cycle does not result in NAS transmission (NAS retransmission) failures or NAS periodic registration failures. Further, the RedCap UE can indicate its reduced capability to the network. In response, the network selects one or more of the eDRX cycle values and indicates the selected value(s) to the RedCap UE. Thereafter, the RedCap UE can set the eDRX cycle to the relevant value and enter the eDRX state. These and other eDRX-related functionalities for RedCap UEs are further described herein below.

The following is a glossary of terms that may be used in this disclosure.

The term "circuitry" as used herein refers to, is part of, or includes hardware components, such as an electronic circuit, a logic circuit, a processor (shared, dedicated, or group) or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable system-on-a-chip (SoC)), or digital signal processors (DSPs) that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, or transferring digital data. The term "processor circuitry" may refer to an application processor, baseband processor, a central processing unit (CPU), a graphics processing unit, a single-core processor, a dual-core processor, a triple-core processor, a quad-core processor, or any other device capable of executing or otherwise operating computer-executable instructions, such as program code, software modules, or functional processes.

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, or the like.

The term "user equipment" or "UE" as used herein refers to a device with radio communication capabilities and may describe a remote user of network resources in a communications network. The term "user equipment" or "UE" may be considered synonymous to, and may be referred to as client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface.

The term "base station" as used herein refers to a device with radio communication capabilities, that is a network node of a communications network (or, more briefly, network), and that may be configured as an access node in the communications network. A UE's access to the communications network may be managed at least in part by the base station, whereby the UE connects with the base station to access the communications network. Depending on the radio access technology (RAT), the base station can be referred to as a gNodeB (gNB), eNodeB (eNB), access point, etc.

The term "computer system" as used herein refers to any type of interconnected electronic devices, computer devices, or components thereof. Additionally, the term "computer system" or "system" may refer to various components of a computer that are communicatively coupled with one another. Furthermore, the term "computer system" or "system" may refer to multiple computer devices or multiple computing systems that are communicatively coupled with one another and configured to share computing or networking resources.

The term "resource" as used herein refers to a physical or virtual device, a physical or virtual component within a computing environment, or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, or the like. A "hardware resource" may refer to compute, storage, or network resources provided by physical hardware element(s). A "virtualized resource" may refer to compute, storage, or network resources provided by virtualization infrastructure to an application, device, system, etc. The term "network resource" or "communication resource" may refer to resources that are accessible by computer devices/systems via a communications network. The term "system resources" may refer to any kind of shared entities to provide services and may include computing or network resources. System resources may be considered as a set of coherent functions, network data objects or services, accessible through a server where such system resources reside on a single host or multiple hosts and are clearly identifiable.

The term "channel" as used herein refers to any transmission medium, either tangible or intangible, which is used to communicate data or a data stream. The term "channel" may be synonymous with or equivalent to "communications channel," "data communications channel," "transmission channel," "data transmission channel," "access channel," "data access channel," "link," "data link," "carrier," "radio-frequency carrier," or any other like term denoting a pathway or medium through which data is communicated. Additionally, the term "link" as used herein refers to a connection between two devices for the purpose of transmitting and receiving information.

The terms "instantiate," "instantiation," and the like, as used herein, refer to the creation of an instance. An "instance" also refers to a concrete occurrence of an object, which may occur, for example, during execution of program code.

The term "connected" may mean that two or more elements, at a common communication protocol layer, have an established signaling relationship with one another over a communication channel, link, interface, or reference point.

The term "network element" as used herein refers to physical or virtualized equipment or infrastructure used to provide wired or wireless communication network services. The term "network element" may be considered synonymous to or referred to as a networked computer, networking hardware, network equipment, network node, virtualized network function, or the like.

The term "information element" refers to a structural element containing one or more fields. The term "field" refers to individual contents of an information element, or a data element that contains content. An information element may include one or more additional information elements.

FIG. 1 illustrates a network environment 100 in accordance with some embodiments. The network environment 100 may include a UE 104 that is part of a Fifth Generation (5G) system (5GS) 108. The 5GS 108 may also include a 5G access network, for example, next generation (NG) radio access network (RAN) 112, and a 5G core network, for example, 5GC 116. The NG RAN 112 may include base stations, for example, gNBs, such as gNB 114, that provide new radio (NR) user plane and control plane protocol terminations toward the UE 104. The NG RAN 112 may be coupled with an access and mobility management function (AMF) 120 of the 5GC 116.

The components of the network environment 100 may be coupled with one another over various interfaces (or reference points) that define signaling protocols between respective components. The interfaces may include a N1 interface between the UE 104 and the AMF 120 (e.g., between a NAS layer, or NAS for brevity, of the UE with the AMF 120); an N2 interface between the NG RAN 112 and the AMF 120; an NR-Uu interface between the UE 104 and the NG RAN 112; an LTE-Uu interface between the UE 104 and an evolved universal terrestrial access network (E-UTRAN)

124; and an Xn interface between the E-UTRAN 124 and the NG RAN 112. It will be understood that these interfaces define end-to-end signaling protocols between respective components. The actual signals may traverse through other components. For example, while signals between the AMF 120 and the UE 104 may be exchanged using N1 protocols, the signals may be communicated through one or more nodes of the NG RAN 112.

The AMF 120 may be a control plane function that provides registration management, connection management, reachability management, and mobility management services. Registration management may allow the UE 104 to register and deregister with the 5GS 108. Upon registration, the UE context may be created within the 5GC 116. The UE context may be a set of parameters that identify and characterize the UE 104. The UE context may include UE identity information, UE capability information, access and mobility information, or protocol data unit (PDU) session information.

The AMF 120, and 5GS 108, in general, may perform a number of registration area management functions to allocate/reallocate a registration area to the UE 104. A registration area may include a set of tracking areas, with each tracking area including one or more cells that cover a geographical area. A tracking area is identified by a tracking area identity, which may be broadcast in the cells of a tracking area.

Connection management may be used to establish and release control plane signaling connection between the UE 104 (e.g., the NAS) and the AMF 120. Establishing a control plane signaling connection moves the UE 104 from connection management (CM)-IDLE to CM-CONNECTED.

Mobility management may be used to maintain knowledge of a location of the UE 104 within a network. Mobility management may be performed by 5GS mobility management (5GMM) sublayers of the NAS within the UE 104 and the AMF 120 to support identification, security, and mobility of the UE 104 and to provide connection management services to other sublayers.

The 5GMM sublayers may be associated with different states that are independently managed per access type (for example, 3GPP access or non-3GPP access). The 5GMM sublayers may be in a 5GMM-DEREGISTERED state if no 5GMM context has been established and the UE location is not known to the network. To establish the 5GMM context, the sublayers may engage in an initial registration, to enter the 5GMM-REGISTERED-INITIATED state and, once the initial registration is accepted, the sublayers may enter the 5GMM-REGISTERED state with a 5GMM context established. From the 5GMM-REGISTERED state, the sublayers may enter a 5GMM DEREGISTERED-INITIATED state once a deregistration is requested. Once the deregistration is accepted, the sublayers may enter the 5GMM-DEREGISTERED state. From the 5GMM-REGISTERED state, the sublayers may also enter a 5GMM-SERVICE-REQUEST-INITIATED state by initiating a service request and may re-enter the 5GMM-REGISTERED state once the service request is accepted, rejected, or fails. A service request, as used herein, may refer to both control plane and user plane service requests.

The 5GMM sublayers may have 5GMM-CONNECTED mode and a 5GMM-IDLE mode that affect how the various procedures are performed.

A 5GMM-CONNECTED mode with RRC inactive indication (or RRC suspended state) is a NAS state introduced by 3GPP to improve resume and suspend operations of an RRC connection by reducing a time taken to reactivate the suspended bearer(s) as compared to long term evolution (LTE) methods to release an RRC connection and activate the RRC connection using a service request procedure. Faster resumption or suspension of active data radio bearers (DRBs) may improve user experience and reduce usage of radio resources.

Transitions to and operations within the 5GMM-CONNECTED mode with RRC inactive indication is defined as follows:

The UE is in 5GMM-CONNECTED mode with RRC inactive indication when the UE is in:
a) 5GMM-CONNECTED mode over 3GPP access at the NAS layer; and
b) RRC_INACTIVE state at the AS layer (see 3GPP TS 38.300 [27]).
. . .

The UE shall transition from 5GMM-CONNECTED mode over 3GPP access to 5GMM-CONNECTED mode with RRC inactive indication upon receiving an indication from the lower layers that the RRC connection has been suspended.
NOTE 0: Any pending procedure or uplink data packet when receiving an indication from the lower layers that the RRC connection has been suspended, triggers a request to the lower layers to transition to RRC_CONNECTED state. This is also the case when the pending procedure or uplink data packet triggered a previous request to the lower layers to transition to RRC_CONNECTED state.
. . .

If the UE in 4GMM-CONNECTED mode with RRC inactive indication receives an indication from the lower layers that the RRC connection has been suspended, the UE shall stay in 5GMM-CONNECTED mode with RRC inactive indication. The UE shall re-initiate any pending procedure that had triggered the request to the lower layers to transition to RRC_CONNECTED state, if still needed.

3GPP TS 24.501 v16.8.0 (2021-04), Section 5.3.1.4.

As such, the UE 104 can operate in a 5GMM-CONNECTED mode with an inactive indication (which can be thought of as a connectivity mode of the NAS layer with the AMF 120 over the signaling control plane) and in an RRC_INACTIVE state (which can be thought of as a connectivity state of the access stratum (AS) layer with the network over a data plane, whereby the UE 104 is not receiving and/or transmitting data). The UE 104 can also operate in the 5GMM-CONNECTED mode for the NAS layer and an RRC_CONNECTED state for the AS layer (whereby the UE 104 is receiving and/or transmitting data).

With Rel-17 of the 3GPP technical specifications, a proposal is under consideration for a RedCap UE. Although no final 3GPP definition exists for what qualifies as a RedCap UE, the RedCap UE generally has a reduced capability relative to a non-RedCap UE, where this capability relates to communications with the network and can help reduce the battery (or power) consumption. A set of possible requirements for what can be involved in the reduced capability is found in 3GPP document RP-210918 (March 2021):

Reduced maximum UE bandwidth:
Maximum bandwidth of an FR1 RedCap UE during and after initial access is 20 MHz.
Maximum bandwidth of an FR2 RedCap UE during and after initial access is 100 MHz.
Reduced minimum number of Rx branches:
For frequency bands where a legacy NR UE is required to be equipped with a minimum of 2 Rx antenna ports, the minimum number of Rx branches supported by specification for a RedCap UE is 1. The specification also supports 2 Rx branches for a RedCap UE in these bands.

For frequency bands where a legacy NR UE (other than 2-Rx vehicular UE) is required to be equipped with a minimum of 4 Rx antenna ports, the minimum number of Rx branches supported by specification for a RedCap UE is 1. The specification also supports 2 Rx branches for a RedCap UE in these bands.

A means shall be specified by which the gNB can know the number of Rx branches of the UE.

Maximum number of DL MIMO layers:

For a RedCap UE with 1 Rx branch, 1 DL MIMO layer is supported.

For a RedCap UE with 2 Rx branches, 2 DL MIMO layers are supported.

Relaxed maximum modulation order:

Support of 256 QAM in DL is optional (instead of mandatory) for an FR1 RedCap UE.

No other relaxations of maximum modulation order are specified for a RedCap UE.

Duplex operation:

HD-FDD type A with the minimum specification impact (Note that FD-FDD and TDD are also supported.)

As used herein, the term "RedCap UE" (or, equivalently, new-radio (NR)-RedCap) refers to a UE that has reduced capability per any adopted 3GPP TS definition. The reduced capability can relate to a communication bandwidth, reception branches, MIMO layers, a modulation order, and/or a duplex operation of the RedCap UE.

A RedCap UE can be used in multiple scenarios, including for enhanced mobile broadband (eMBB), massive machine-type communication (mMTC), Ultra-Reliable and Low Latency communication (URLLC), time sensitive communication (TSC), industrial internet of things (IIoT), smart city innovations, wearables (eHealth related devices, personal protection equipment (PPE), and medical monitoring devices for use in public safety applications, etc.), and other use cases. UE complexity reduction, coverage recovery, and/or UE power saving are some of the key requirements for these class of devices.

DRX is a mechanism to reduce the power consumption of a UE. Generally, this mechanism involves the UE entering sleep mode (e.g., by deactivating or powering off its receive chain or some components thereof) for a certain period and then waking up (e.g., by activating or powering on the receive chain or the components) after a fixed interval to receive signals. eDRX is an extension of DRX to further reduce the power and involves a longer duration of the sleep mode.

eDRX is already supported for LTE, whereby the eDRX cycle's duration is 2,621.44 seconds for wideband (WB)-N1 UE in the 5GMM-IDLE mode, 10,488.76 seconds for narrowband (NB)-N1 UE in the 5GMM-IDLE mode, and 10.24 second for the WB-N1 UE in the 5GMM CONNECTED mode with the RRC inactive indication.

eDRX features can be used to enhance and improve the power consumption of RedCap UEs. However, extending the DRX cycles up to 10,488.76 seconds (e.g., as in the case of LTE for NB-N1 UEs in the 5GMM-IDLE mode) can impact operations of the RedCap UEs. These operations can include NAS transmissions and NAS periodic registrations. To mitigate, reduce, or avoid the impact, particular eDRX cycle values can be defined along with NAS transmission timers and NAS periodic registration timers as further described in the next figures.

Figure 2:
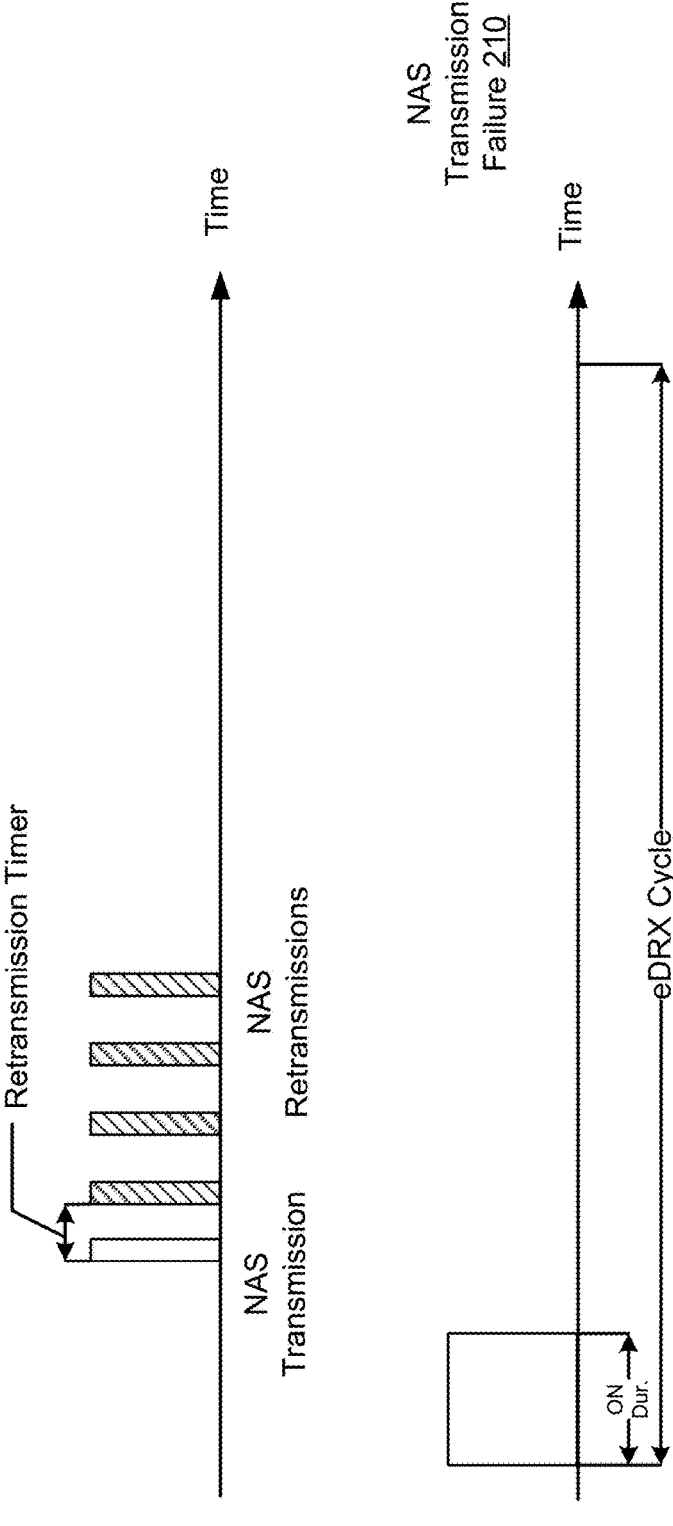
FIG. 2 illustrates an example of timing diagrams for non-access stratum (NAS) transmissions and extended discontinuous reception (eDRX), in accordance with some embodiments.

FIG. 2 illustrates an example of timing diagrams 200 for NAS transmissions and eDRX, in accordance with some embodiments. These timing diagrams 200 can result in a NAS transmission failure 210. As illustrated, the top timing diagram corresponds to NAS transmissions, and the bottom timing diagram corresponds to the eDRX cycle.

Generally, a NAS layer of a UE (e.g., the UE 104) can send signaling information to the network (e.g., to the AMF 120). Likewise, the network can send signaling information to the UE. These type of signaling information communications are referred to herein as NAS transmissions. A network node (e.g., the UE or the AMF) can initiate a NAS-related procedure and perform a NAS transmission of a message (illustrated with a blank rectangle in the top timing diagram) to the other node (e.g., the AMF or the UE) as a part of this procedure. Based on this message, the node expects a response back from the other node (e.g., from the AMF or the UE). If the response is not received, a NAS retransmission (illustrated with a diagonally-dashed rectangle in the top timing diagram) of the message is performed. If the response is still not received, the NAS retransmission can be performed a number of times (this number is illustrated as five times in FIG. 2). And if the response is still not yet received, the node can determine the NAS transmission failure 210 and this failure can be considered as a failure of the NAS-related procedure. The timing between the NAS transmission and the first NAS retransmission and between the NAS retransmissions is shown in FIG. 2 as a retransmission timer and is an example of a NAS timer. Example values of the retransmission timer are defined in Tables 10.2.1 and 10.3.1 of 3GPP TS 24.501 V16.8.0 (2021-04).

As illustrated in the bottom timing diagram, the eDRX cycle can include an ON Duration corresponding to a number of sub-frame(s) at the beginning of each eDRX cycle and during which the UE can perform physical downlink control channel (PDCCH) monitoring. Unless the ON Duration is extended, during the remaining portion of the eDRX cycle, the UE is in a power-save mode and cannot receive information from the network (including signaling information and downlink data). The duration value (e.g., time length) of the eDRX cycle and the ON Duration value can be configured by the network (e.g., the AMF).

As such, if the eDRX cycle has a duration value (e.g., a time length) that is too large (e.g., up to 10,485,76 seconds), the NAS transmission and retransmissions may occur while the UE is in the power save mode (e.g., sleeping). In an example, the transmitting node is the UE. In this case, the UE is not capable of receiving the response back from the network and, thus, determines the occurrence of the NAS transmission failure 210. In another example, the transmitting node is the network. In this case, the UE is not capable of receiving the NAS transmission and retransmissions and does not send the response back to the network. As such, the network determines the occurrence of the NAS transmission failure 210.

Figure 3:
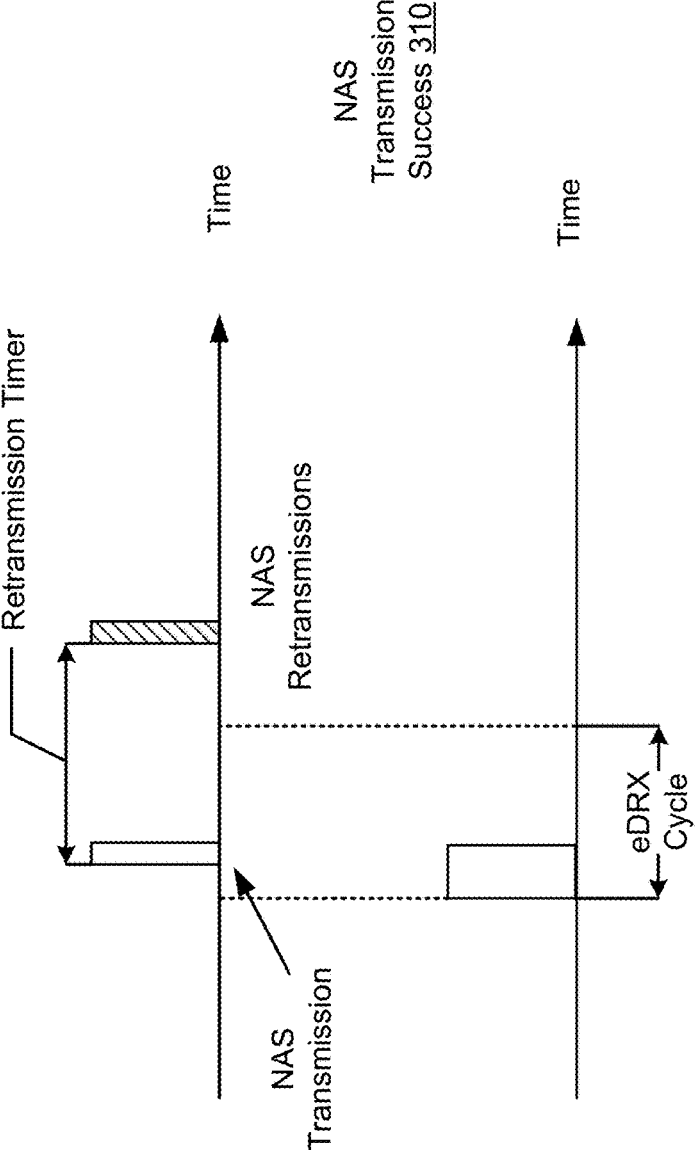
FIG. 3 illustrates another example of timing diagrams for NAS transmissions and eDRX, in accordance with some embodiments.

FIG. 3 illustrates another example of timing diagrams 300 for NAS transmissions and eDRX, in accordance with some embodiments. Unlike the timing diagrams 200, these timing diagrams 300 can result in a NAS transmission success 310. In particular, the duration value of the eDRX cycle and/or the value of the retransmission timer can be adjusted to increase the likelihood of the NAS transmission success 310 and reduce the likelihood of a NAS transmission failure. As illustrated, the top timing diagram corresponds to NAS transmissions, and the bottom timing diagram corresponds to the eDRX cycle.

Generally, for non-RedCap UEs, the maximum values of the retransmission timer are:

5GMM in NB-N1 mode: UE side: T3519-300 seconds, Network side: T3575-255 seconds;

5GMM in WB-N1 mode: UE side: T3525-120 seconds, Network side: T3575-60 seconds;

5GSM in NB-N1 mode: UE side: T3580-196 seconds, Network side: T3593-240 seconds; and 5GSM in WB-N1 mode: UE side: T3580-24 seconds, Network side: T3593-60 seconds.

In an example, for a RedCap UE, the values of the retransmission timer can be extended similar to WB-N1 and NB-N1. For example, the values can be in the range of 200 to 300 seconds, such as about 255 seconds.

Figure 4:
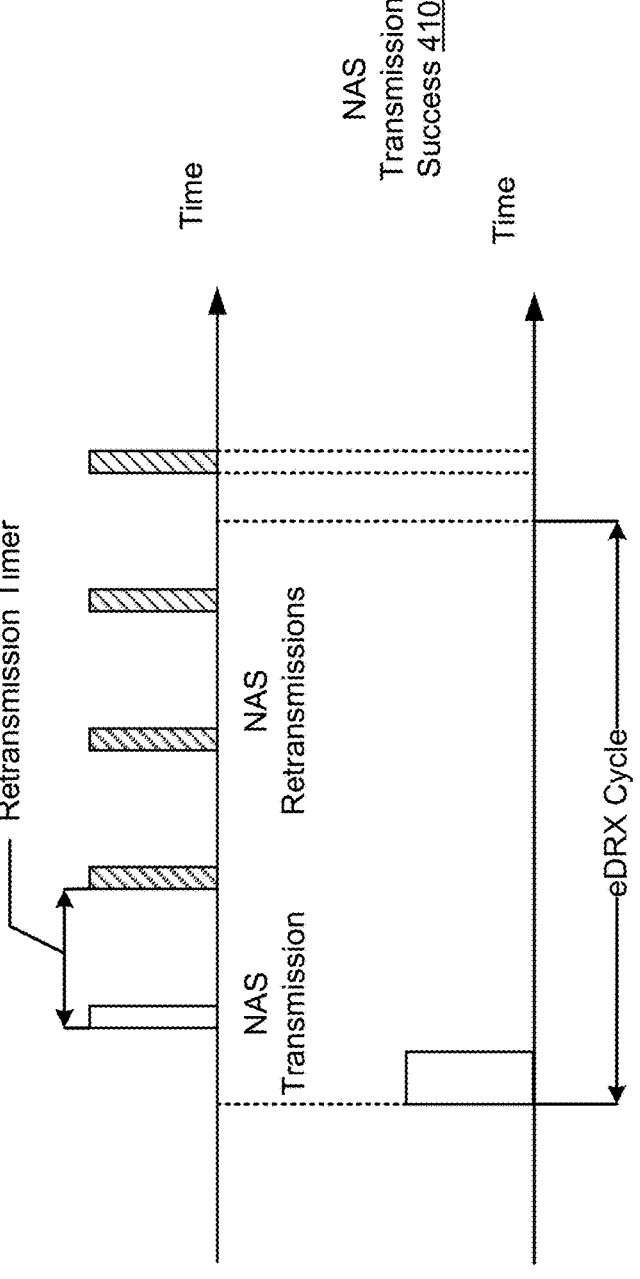
FIG. 4 illustrates a further example of timing diagrams for NAS transmissions and eDRX, in accordance with some embodiments.

The duration value of the eDRX cycle can also be defined for the RedCap UE based on the extended value of the retransmission timer. In the illustration of FIG. 4, the duration value is set to be equal to or smaller than an extended value of the retransmission timer. For instance, when the extended value is in the range of 200 to 300 seconds, the eDRX cycle can also have a length in the range of 200 to 300 seconds. In a particular illustration, when the extended value is about 255 seconds, the eDRX cycle length is equal to or smaller than about 255 seconds.

In the illustrative example of FIG. 3, the NAS transmission occurs while the RedCap UE is in the power save mode and, thus, is not received. However, because the duration value of the eDRX cycle is equal to or smaller than the extended value of the retransmission timer, the first NAS retransmission can be received, resulting in the NAS transmission success 310.

FIG. 4 illustrates a further example of timing diagrams 400 for NAS transmissions and eDRX, in accordance with some embodiments. Similar to the timing diagrams 300, these timing diagrams 400 can result in a NAS transmission success 410. In particular, the duration value of the eDRX cycle is larger than the value of the retransmission time by being set to correspond to the retransmission timer multiplied by a number of NAS retransmissions. As illustrated, the top timing diagram corresponds to NAS transmissions, and the bottom timing diagram corresponds to the eDRX cycle.

In an example, for a RedCap UE, the values of the retransmission timer can be extended similar to WB-N1 and NB-N1. For example, the values can be in the range of 200 to 300 seconds, such as about 255 seconds. In another example, the extended values can be smaller than those of WB-N1 and NB-N1. For instance, if the number of NAS retransmissions is "k," the extended values can be equal to MaxValues$_{WB-N1/NB-N1}$/(k+1). In a particular illustration of 255 seconds and four retransmissions, the extended values can be set to be equal to or less than 255/(4+1)=51 seconds.

The duration value of the eDRX cycle can also be defined for the RedCap UE based on the extended values of the retransmission timer and the number "k" of NAS retransmissions. For example, the duration value can be equal to Max Extended Values×(k+1)+predefined time margin. Referring back to the particular illustration of 51 seconds for the retransmission timer and to a 55 seconds predefined time margin, the duration value can be set to 51×(5)+55=300 seconds.

In the illustrative example of FIG. 3, the NAS transmission and the first three NAS retransmissions occur while the RedCap UE is in the power save mode and, thus, are not received. However, the fourth NAS retransmission can be received, resulting in the NAS transmission success 410.

Figure 5:
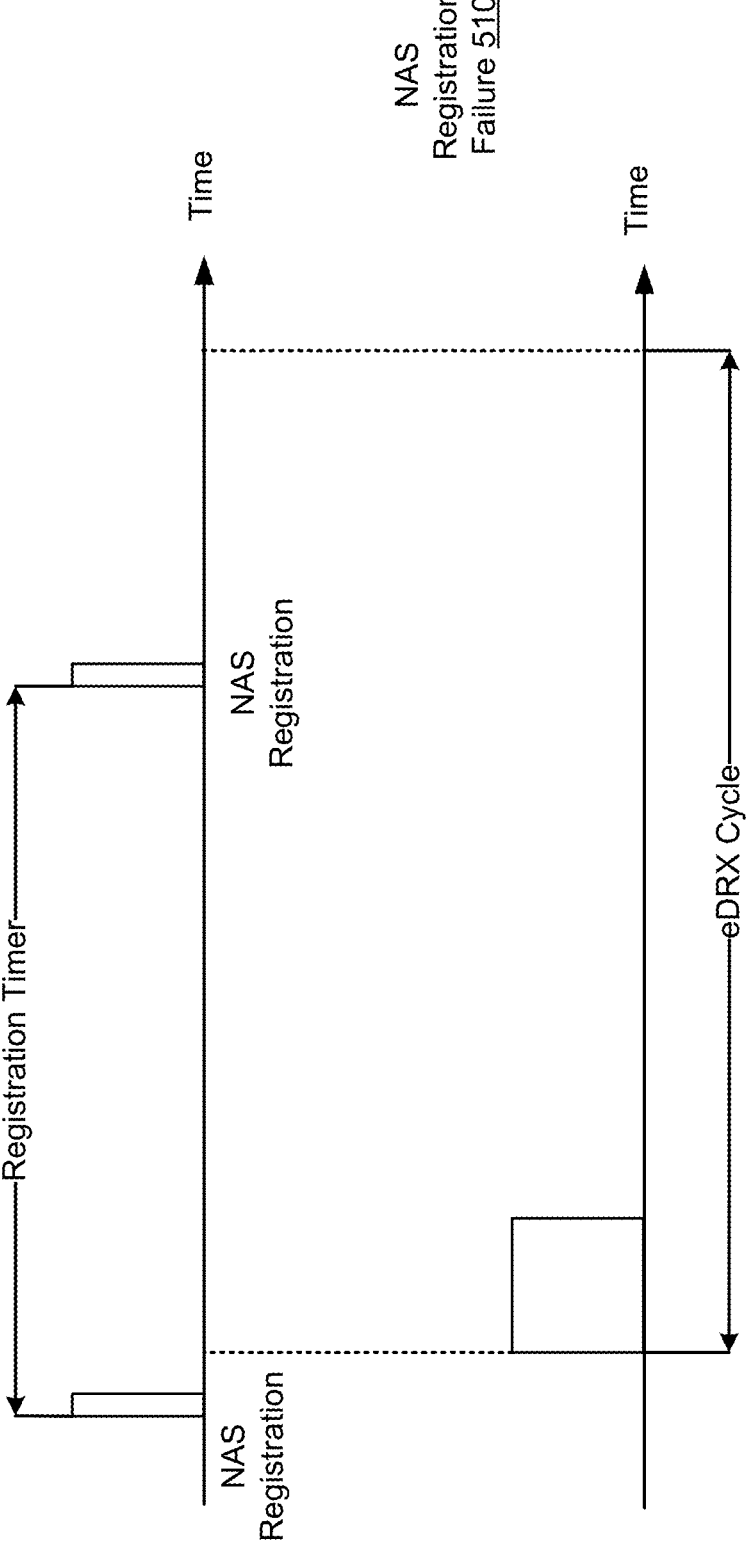
FIG. 5 illustrates an example of timing diagrams for NAS registration and eDRX, in accordance with some embodiments.

FIG. 5 illustrates an example of timing diagrams 500 for NAS registration and eDRX, in accordance with some embodiments. These timing diagrams 500 can result in a NAS registration failure 510. As illustrated, the top timing diagram corresponds to NAS period registrations, and the bottom timing diagram corresponds to the eDRX cycle.

Generally, a UE performs a NAS periodic registration with a network (e.g., with an AMF of the network) to indicate a location of the UE. The location can relate to the network (e.g., the tracking area—TA) such that the network can page the UE. Rel-16 allows the use of a 54 minutes NAS periodic registration timer T3512. In the illustration of FIG. 5, the UE performs a first NAS registration (e.g., by sending a NAS registration request to the network) and, after the elapse of the NAS periodic timer (shown as a registration timer in the figure), performs a second NAS registration.

As illustrated in the bottom timing diagram, the duration value of the eDRX cycle is set to be greater than the value of the registration timer (e.g., 10,485.76 seconds compared to 54 minutes). Because of the longer eDRX duration, the second registration can only be performed while the UE is in the power save mode. As such, if the UE remains in the power save mode, the second NAS registration may not be performed, resulting in the NAS registration failure 510.

In contrast, a RedCap UE can be configured to use a eDRX cycle shorter than the registration timer to increase the likelihood of a NAS registration success. In this case, and referring back to the illustration of FIG. 5, the RedCap UE can wake up to successfully perform the second NAS registration.

Figure 6:
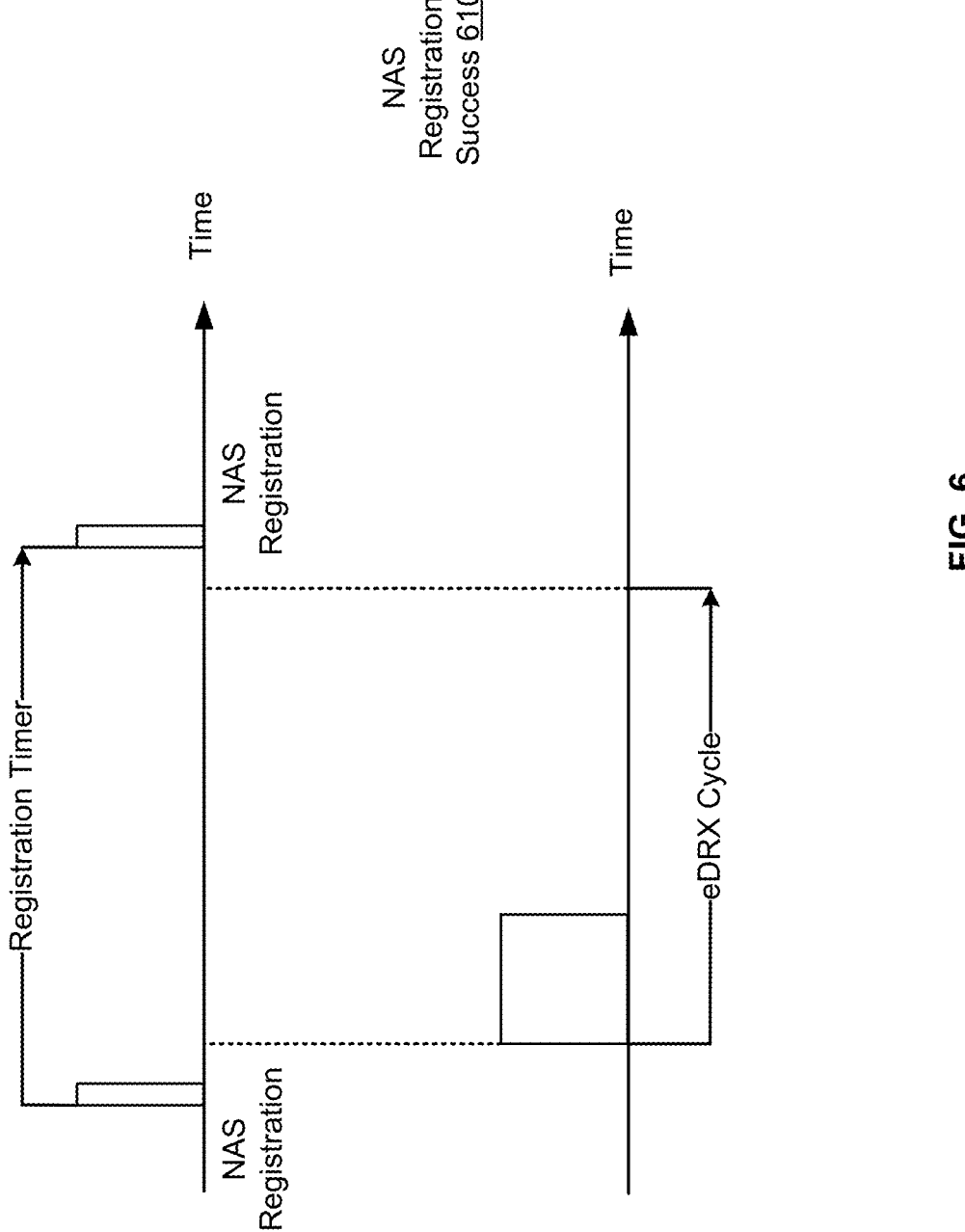
FIG. 6 illustrates another example of timing diagrams for NAS registration and eDRX, in accordance with some embodiments.

FIG. 6 illustrates another example of timing diagrams 600 for NAS registration and eDRX, in accordance with some embodiments. Unlike the timing diagrams 500, these timing diagrams 600 can result in a NAS registration success 610. In particular, the duration value of the eDRX cycle and/or the value of the registration timer can be adjusted to increase the likelihood of the NAS transmission success 610 and reduce the likelihood of a NAS transmission failure. As illustrated, the top timing diagram corresponds to NAS period registrations, and the bottom timing diagram corresponds to the eDRX cycle.

In an example, the duration value of the eDRX cycle can be defined specifically for the RedCap UE type. Referring back to FIGS. 34, this duration value can be based on a value of a NAS retransmission timer. The value of the registration timer can be made to be equal to or larger than the duration value of the eDRX cycle and yet can be smaller than 54 minutes. For instance, if the duration value of the eDRX cycle is set to be about 255 seconds (or in the range of 200 to 300 seconds), the registration timer can be set to be equal to at least 255 seconds (or to a value within the 200 to 300 seconds range).

In the illustration of FIG. 6, the RedCap UE performs a first NAS registration then enters the eDRX mode. Because the registration timer is longer than the eDRX cycle, the RedCap UE exits the eDRX mode prior to performing a second NAS registration. Accordingly, the second NAS registration results in the NAS registration success 610.

Figure 7:
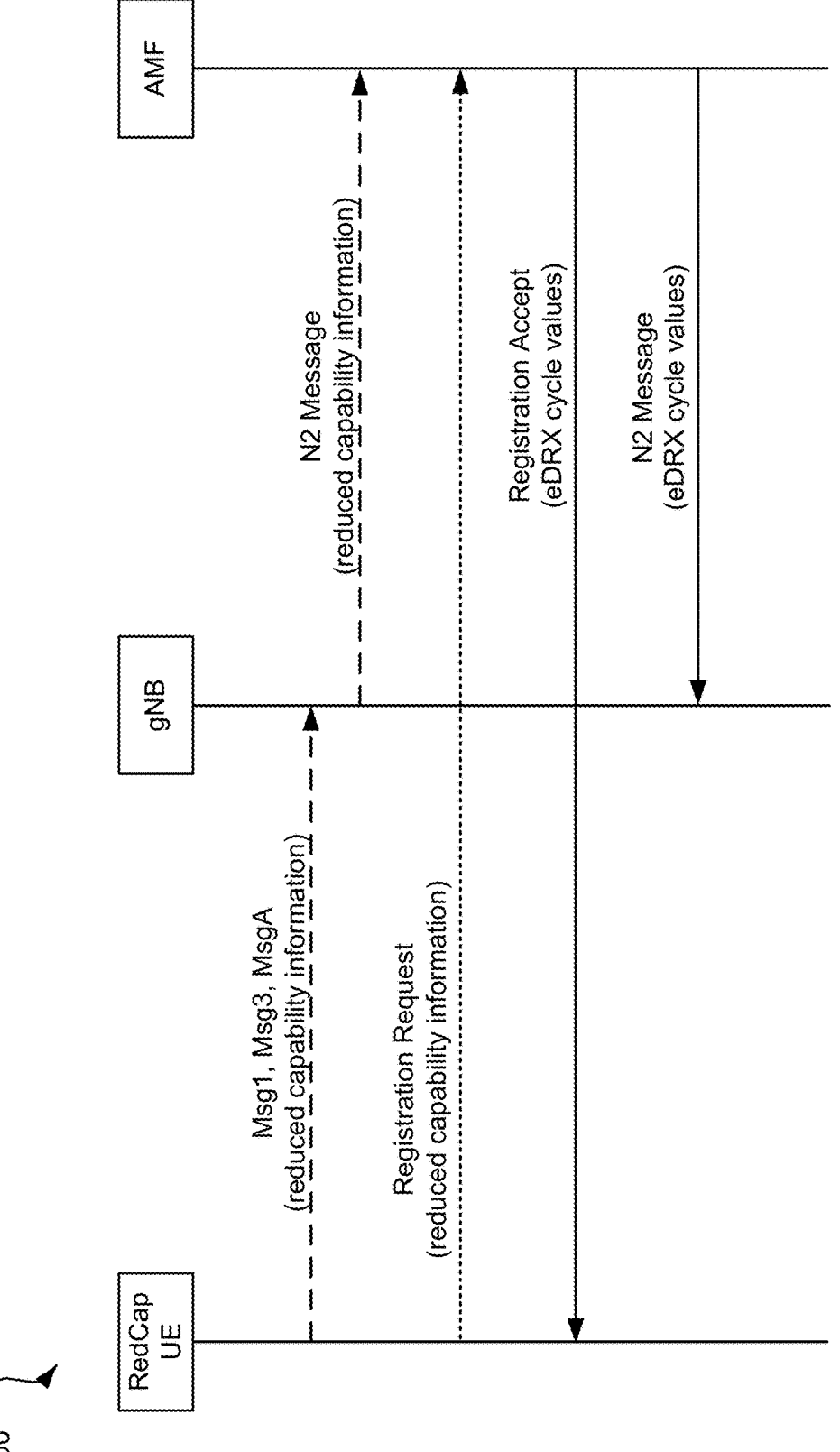
FIG. 7 illustrates an example of signaling diagram for indicating reduced capability and associated eDRX cycle values, in accordance with some embodiments.

FIG. 7 illustrates an example of signaling diagram 700 for indicating reduced capability and associated eDRX cycle values, in accordance with some embodiments. Generally, RedCap UEs may have specific requirements, such as support for specific eDRX cycle durations or need to support reduced number of packet filters (in an allowable range of seventeen to one-thousand twenty-four). Further, the Red- Cap UEs need to be constrained from using features not intended for RedCap UEs, such as carrier aggregation, dual connectivity, and wider bandwidths. The Redcap UEs may also be configured with operator specific access categories, and policy control, and a network (e.g., an AMF thereof) needs to be aware of the UE capability to support subscription validation, differentiated charging, access control. As such, the network needs to determine that the UE is a Redcap UE and is using eDRX. The signaling diagram 700 can be implemented to provide the RedCap UE indication, the eDRX use indication, and the eDRX configuration.

As illustrated, the signaling diagram 700 involves a RedCap UE, a gNB of a network, and an AMF of the network. Two mechanisms can be used, in conjunction or alternatively to each other, to indicate to the network that the UE is a RedCap UE. The first mechanism is illustrated with dashed arrows, whereas the second mechanism is illustrated with a dotted arrow.

In the first mechanism, the RedCap UE can send a message to the gNB, where the message includes reduced capability information. This information indicates that the RedCap UE has the reduced capability of a RedCap UE type, its type is the RedCap UE type, and/or that it is operating in a RedCap operational mode rather than a non-RedCap operational mode (which can be a normal operational mode that does not constrain the operations to the reduced capability). Further, the reduced capability information can indicate supported eDRX cycle values (e.g., particular duration values that correspond to a preference of the RedCap UE; generally, however, these values are not usable to the gNB or RAN and are usable to the AMF. Thus, when the first mechanism is used, the eDRX cycle values are only optionally indicated). In an example, the message is at least one of a Msg1, Msg3, or MsgA. Also in the first mechanism, the gNB can send a message to the AMF, where the message includes a portion or the entirety of the reduced capability information. In an example, this message can be sent over the N2 interface between the gNB and the AMF.

In the second mechanism, the RedCap UE can send an N1 message to the AMF, where this message includes the reduced capability information. For example, the N1 message can be included in a REGISTRATION REQUEST message.

In both mechanisms, the AMF becomes aware of the reduced capability of the RedCap UE. Further, the RedCap UE sends the REGISTRATION REQUEST message (which may not include the reduced capability information if only the first mechanism is used) as a part of a NAS registration procedure. In this request, the RedCap UE can indicate that eDRX is to be used. Accordingly, the AMF determines one or more values to use for the eDRX cycle and can indicate such value(s) in a REGISTRATION ACCEPT message sent to the RedCap UE. The AMF can also indicate this timing configuration of the eDRX cycle to the gNB in a message over the N2 interface.

In an example, the AMF determines a value for the eDRX cycle based on the reduced capability of the RedCap UE. For instance, possible values can be pre-defined in a technical specification (e.g., a 3GPP TS) and can be stored by the AMF in a data structure (e.g., a table). One set of values can be associated with the 5GMM-IDLE mode, and another set of values can be associated with the 5GMM-CONNECTED mode with the inactive indication. The predefinition of the different values can be based on predefined NAS timers (including retransmission timers and/or registration timers). Accordingly, the AMF can look up the table and determine the values applicable to the reduced capability and the 5GMM-IDLE mode and the 5GMM-CONNECTED mode with the inactive indication.

Other factors can be used to determine the value of the eDRX cycle. For example, and as illustrated in the next figures, the network (the AMF or the gNB) can buffer data to be transmitted to the RedCap UE. The longer the eDRX cycle, the larger the amount of buffered data may be, and the larger the needed memory space may become. Accordingly, one factor for determining the value of the eDRX cycle is the available memory space. For instance, the larger the available memory space, the longer the eDRX cycle may be made. In another example, the buffered data can have a priority. Depending on the priority, the value can be set. For instance, the higher the priority, the shorter the eDRX cycle may be made. In a further example, the buffered data may be associated with a particular type of application of the RedCap UE (e.g., voice, messaging, emergency alerts, etc.). The application type can be associated with data time sensitivity (e.g., voice data can be more time sensitive than messaging data, but less time sensitive than emergency alert data). As such, the value can be defined based on the application type or, equivalently, the data time sensitivity. The higher the time sensitivity, the shorter the eDRX cycle may be made.

Although the signaling diagram 700 is illustrated in connection with a gNB, the embodiments of the present disclosure are not limited as such. For instance, the RedCap UE can include the reduced capability information during LTE Attach or tracking area update (TAU) procedures so that E-UTRAN eNB can redirect the RedCap UE to an appropriate RedCap enabled NG-RAN gNB.

Figure 8:
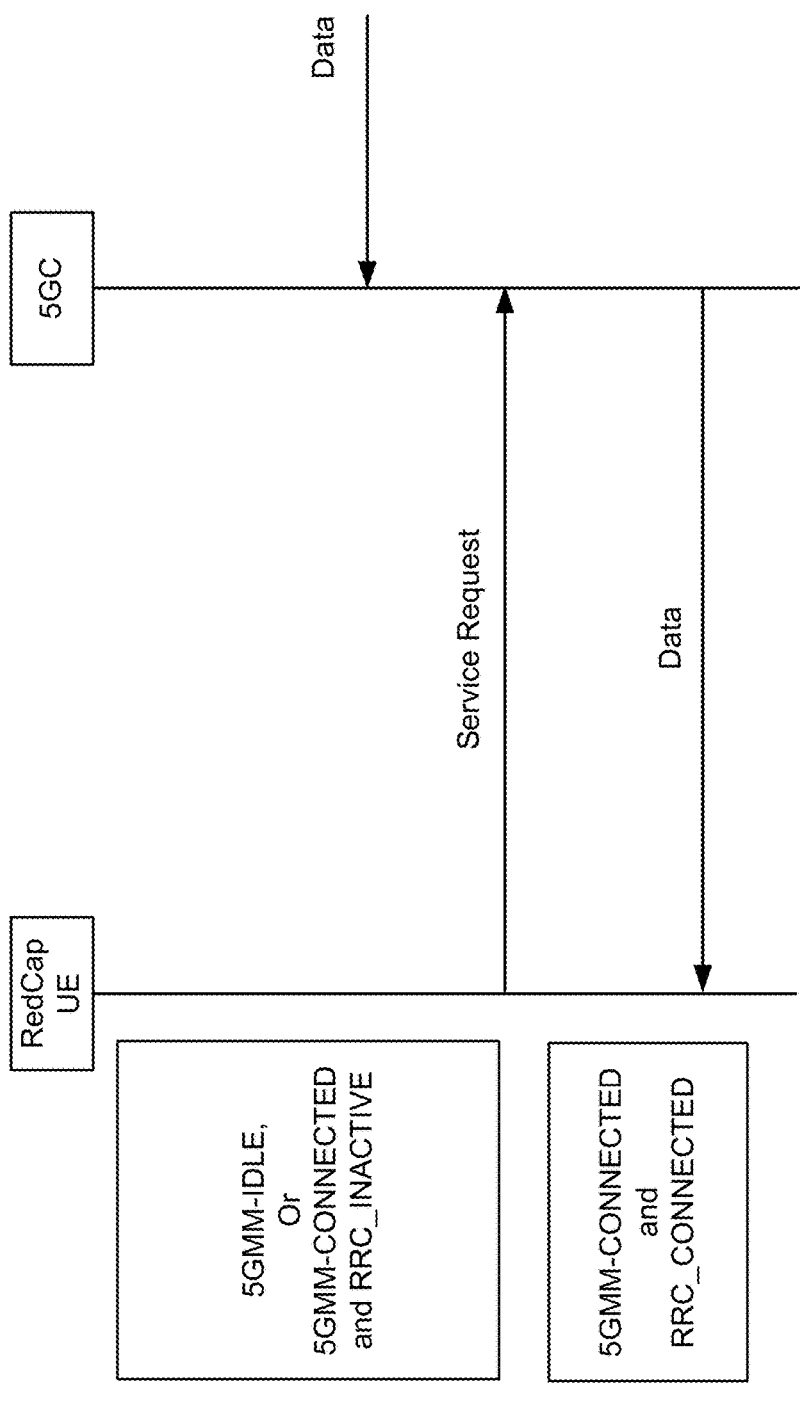
FIG. 8 illustrates an example of a data transmission diagram based on reduced capability, in accordance with some embodiments.

FIG. 8 illustrates an example of a data transmission diagram 800 based on reduced capability, in accordance with some embodiments. In particular, data (e.g., DL packets) can be buffered by a network (e.g., a 5GC or an AMF thereof) based on a UE state (e.g., 5GMM-IDLE mode and the 5GMM-CONNECTED mode with the inactive indication) and sleep cycle length. In particular, for a RedCap UE, the sleep cycle length may be longer than that of a non-RedCap UE because of the longer eDRX cycle. Thus, the network may buffer a relatively larger amount of data. In the illustration of FIG. 8, the buffering is performed by the 5GC.

In an example, the data transmission diagram 800 involves a RedCap UE and 5GC of a network. While RedCap UE is operating in a 5GMM-IDLE mode or a 5GMM-CONNECTED mode with an inactive indication, the UE can enter a power saving mode (e.g., a sleep cycle) during a DRX cycle. The 5GC can buffer data to be transmitted to the RedCap UE upon the UE transitioning from the 5GMM-IDLE mode or the 5GMM-CONNECTED mode with the inactive indication to the 5GMM-CON-NECTED mode with the RRC_CONNECTED state. In this case, the transition can be indicated by the UE to the 5GC based on a SERVICE REQUEST or a CONTROL PLANE SERVICE REQUEST (or a resume request). Upon receiving the service request from the RedCap UE, the 5GC can send the buffered data to the RedCap UE (along with other signaling information, such as a SERVICE ACCEPT message).

The buffered data can be temporarily stored in a memory space in association with information about a user plane function (UPF) session or a session management function (SMF) session with the RedCap UE. This information can include, for example, the internet protocol (IP) address of the UE. The amount of data that the 5GC buffers for the RedCap UE can vary based on a number of factors. The factors can include the amount of available memory space at the 5GC. This amount can be dedicated per UE or can be shared among multiple UEs (in which case, the amount of buffered data for the RedCap UE can depend on the number of other UEs for which the 5GC is also buffering data). The factors can also include the duration length of the eDRX cycle. Yet another factor can be the actual amount of data that is received and is to be sent to the RedCap UE. Further factors can include the priority of the data, type of application associated with the data, and/or time sensitivity of the data.

Figure 9:
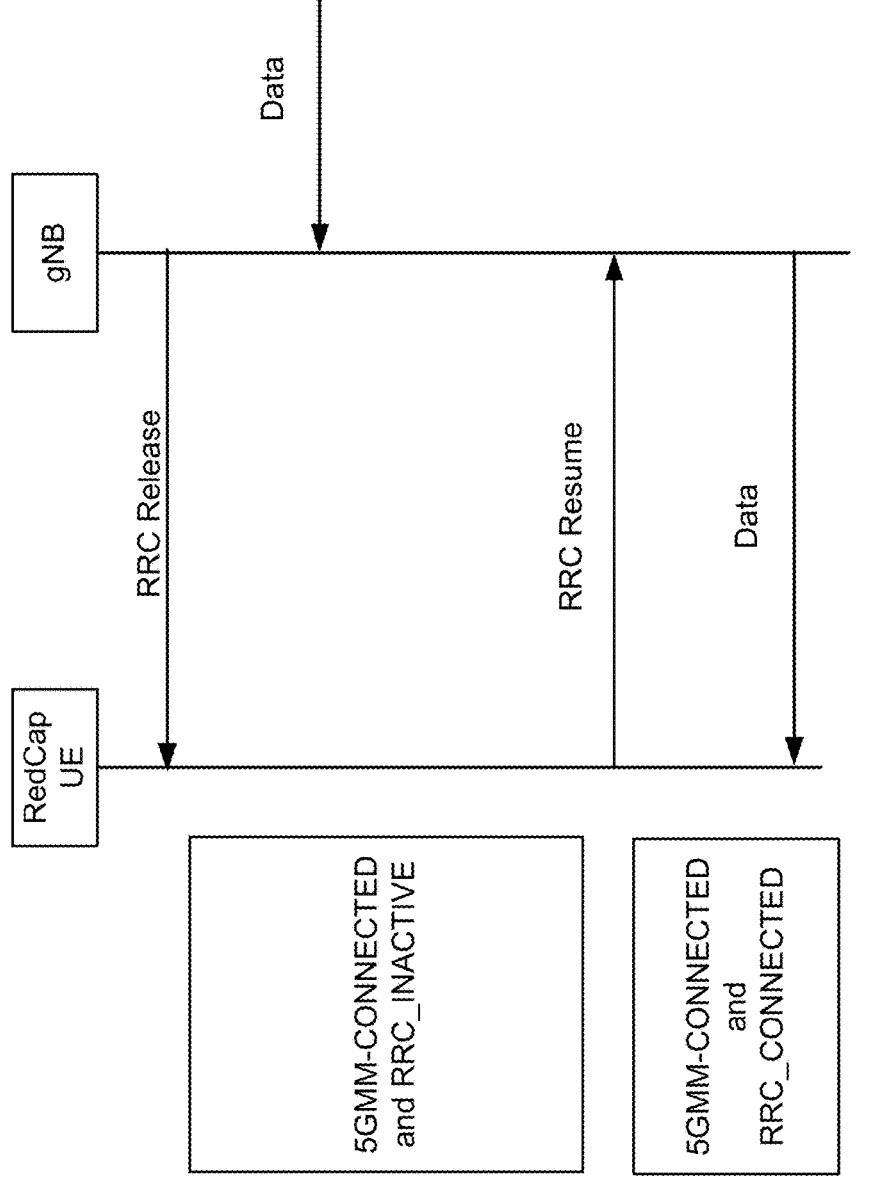
FIG. 9 illustrates another example of a data transmission diagram based on reduced capability, in accordance with some embodiments.

FIG. 9 illustrates another example of a data transmission diagram 900 based on reduced capability, in accordance with some embodiments. Here, rather than the 5GC buffering the data, a gNB of the network buffers the data. This type of buffering may be possible when the UE is operating in the 5GMM-CONNECTED mode with an inactive indication.

As illustrated, the gNB can send an RRC release message to the RedCap UE to transition into the 5GMM-CON-NECTED mode with the inactive indication. While the RedCap UE is in the 5GMM-CONNECTED mode with the inactive indication and during an eDRX cycle, the gNB can receive data (e.g., DL packet from the 5GC) to be transmitted to the UE. The gNB can buffer this data. The buffered data can be stored in a memory space of the gNB in association with an identifier of the UE (e.g., a fifth generation (5G) global unique temporary identifier (GUTI)). Upon receiving a RRC resume message from the RedCap UE, the gNB can send the data (along with any other signaling such that the UE can transition to the 5GMM-CONNECTED mode and the RRC_CONNECTED state to receive the data). The amount of buffered can depend on one or more of the factors described herein above.

Figure 10:
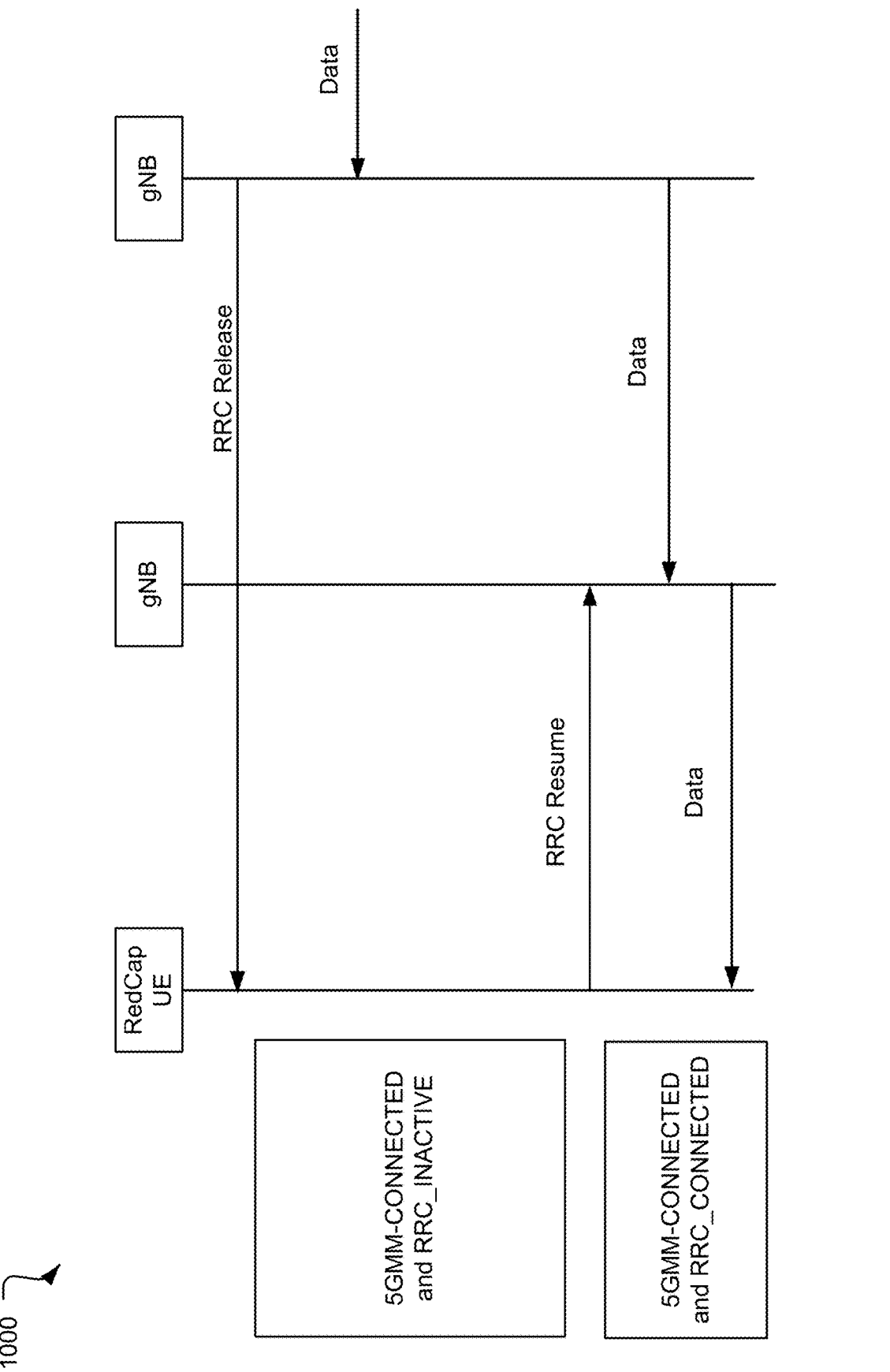
FIG. 10 illustrates a further example of a data transmission diagram based on reduced capability, in accordance with some embodiments.

FIG. 10 illustrates a further example of a data transmission diagram 1000 based on reduced capability, in accordance with some embodiments. Here, a first gNB of the network buffers the data for a RedCap UE. However, when the RedCap transitions to the RRC_CONNECTED state, the RedCap UE is connected to a second gNB. In this case, a cell change has occurred and the first gNB sends the buffered data to the second gNB that then sends the received data to the RedCap UE based on the cell change.

In an example, the first gNB sends an RRC release message to the RedCap UE such that this UE can transition to operating in a 5GMM-CONNECTED mode with an inactive indication. While the RedCap UE is in the 5GMM-CONNECTED mode with the inactive indication and during an eDRX cycle, the first gNB receives data (e.g., DL packets from the 5GC) to be transmitted to the RedCap UE. Accordingly, the first gNB buffers this data for the RedCap UE.

Subsequently, the UE wakes up and performs a mobility and periodic registration update procedure (e.g., to update the network about the TA list, to connect to the second gNB, and/or to transition to the 5GMM-CONNECTED mode with the RRC_CONNECTED state). This mobility and periodic registration update procedure may include the second gNB receiving an RRC resume message from the RedCap UE. The first gNB sends the buffered data to the second gNB that then sends this data to the RedCap UE. Different mechanisms are possible to send the buffered data from the first gNB to the second gNB. In one example, a pull mechanism is used, whereby the second gNB requests the buffered data from the first gNB upon receiving the RRC resume message from the RedCap UE. In another example, a push mechanism is used, whereby the network (e.g., the 5GC) notifies the first gNB of the RedCap UE's connection to the second gNB, and the first gNB sends the buffered data based on this notification.

The techniques described herein above can mitigate the impact of eDRX to the reduced capability of a RedCap UE. For example, bad user experience due to delayed DL NAS procedure (mobility terminated (MT) voice over new radio (VoNR)) can be mitigated by knowing more about specific UE capability and enabling longer eDRX cycles for certain categories of UEs only, such as in IoT, sensors, wearables and avoid UEs that cannot tolerate high latency communication. If that is not enabled, then based on UE action, multimedia telephony (MMTEL) services may be released implicitly for longer eDRX cycles.

Further, the network (RAN and/or 5GC) can be easily overloaded due to suspending all DL 5GSM messages. This can be mitigated by buffering in the 5GC, limiting eDRX cycles (e.g., to 255 seconds), having larger storage space at 5GC entities (cloud). In addition, NAS procedure collisions can happen more often. This can be mitigated by knowing more about UE capability and type of communication conducted before enabling longer eDRX cycles. The AMF may limit the number of UEs that are permitted to have longer eDRX cycles at any given time.

Other mechanism are further possible to improve the support of a RedCap UE of eDRX. In an example mechanism, the RedCap UE can delay the start of the eDRX cycle to increase the likelihood of receiving data and/or can extend the ON Duration to increase the likelihood of detecting a paging message. For instance, when the RedCap UE has completed a registration procedure for mobility and periodic registration update (MRU), the RedCap UE may keep the NAS connection for a first amount of time (e.g., "x" seconds, which can be referred to as an extended connected time) before entering the eDRX mode. Additionally or alternatively, the RedCap UE may monitor paging for a second amount of time (e.g., "y" seconds, which can be referred to as "wait time") before going entering the eDRX mode (e.g., enter the power save mode). The first amount of time and/or the second amount of time may be used upon a determination that the timing difference between the MRU and the start of the eDRX cycle is beyond a certain timing threshold (e.g., a predefined threshold in minutes). Doing so can enable the network to push the pending data to the RedCap UE sooner than waiting for the next paging occasion.

In another example mechanism, an identifier of the Red-Cap UE is used in a NAS procedure. Rather than assigning a different identifier each time the NAS procedure is performed, the same identifier can be-reassigned. For instance, the NAS procedure includes a paging procedure, and the identifier includes a 5G-GUTI. The 5G GUTI can re-usable for a plurality of paging procedures (e.g., up to a maximum number "N"), or is changed (e.g., before this maximum number "N" is reached) based on a signaling message from the RedCap UE or an MRU from the RedCap UE. In this way, no mandate is used for re-assigning of 5G-GUTI at every paging procedure. This mechanism can reduce the signaling overhead associated with re-assigning 5G-GUTI.

In yet another example mechanism, the RedCap UE performs a high priority public land mobile network (HP-PLMN) search. This search involves a time that can be based on the duration value of eDRX cycle. Additionally or alternatively, the HPPLMN search is synchronized with the eDRX cycle (the start of this search can be synchronized with an end of the eDRX cycle or with an ON Duration of the eDRX cycle). In other words, an HPPLMN search duration can closely match with eDRX timer duration. The HPPLMN search timer duration can be stored in the SIM and closely match with EC-GSM-IoT, Category M1 or Category NB1 values. Doing so enables the RedCap UE to stay in sleep mode for longer and synchronizing the search with paging wake-up.

In yet another example mechanism, the RedCap UE performs a PLMN search prior to performing a registration procedure. This search can consider whether a cell support the reduced capability for UEs being of the RedCap UE type. When the RedCap UE finds multiple cells and determines that one of these cells supports the reduced capability, a cell selection (or reselection) procedure to select this even when another cell that does not support the reduced capability is associated with a stronger signal strength. If multiple cells are found and support the reduced capability, the RedCap UE can choose one of them based on other factors, such as the signal strengths. This mechanism can be used because RedCap UEs have specific capabilities and not all neighbor cells in a PLMN may support RedCap UEs. Accordingly, the initial PLMN and cell selection can be modified to consider the network capability before triggering the registration. A Redcap UE can consider a cell's support for RedCap in a system information block (SIB) indication before attempting to select the cell for registration. If unable to find a RedCap-capable cell, the RedCap UE behavior may be modified relative to when a RedCap-capable cell is found. For instance, the RedCap UE may camp on a non-RedCap cell for limited service and emergency call establishment. In another illustration, the RedCap UE may camp on other radio access technology (RAT) or PLMN for emergency services.

In also another example mechanism, a UE supports multiple-operational mode, where a first operational mode that uses the reduced capability (e.g., is a RedCap-operational mode), and where a second operational mode does not use the reduced capability (e.g., is a non-RedCap-operational mode). In this case, the UE can switch between these operational modes to operate as a RedCap UE and a non-RedCap UE (although not simultaneously). When the UE switches from operating in the RedCap-operational mode to a non-RedCap-operational mode, the UE can send, to the network, an indication about the switch. A PDU session that was ongoing before the switch can remain ongoing after the switch. A context and/or a parameter of the PDU session that was used before the switch can accordingly remain usable after the switch. Conversely, the network (e.g, a 5GC thereof) can receive the indication and re-used, after the switch, the same PDU session and/or context/parameter of the PDU switch. In this way, the UE can be enabled to switch between RedCap and normal UE based on internal constraints (e.g., thermal, battery, need for higher bandwidth, etc.). When switching happens, minimal interruption to ongoing services can occur. Thus, when a UE is capable of operating in normal and reduced capability (not simultaneously), the UE can decide to switch between these modes of operation. When switching happens, the UE may perform MRU and update the UE current mode of operation without losing PDU sessions and some its associated context/parameters (e.g., IP multimedia subsystem (IMS) or other critical PDU sessions).

FIG. 11 illustrates an example of an operational flow/algorithmic structure 1100 for indicating reduced capability and associated eDRX cycle values, in accordance with some embodiments. The operational flows/algorithmic structure 1100 can be implemented by a UE in support of a reduced capacity (e.g., such that the UE can operate as a RedCap UE). The UE can be, for example, the UE 104 or the UE 1400, or the operational flows/algorithmic structure 1100 can be implemented by components of the UE, such as by processors 1404.

In an example, the operational flow/algorithmic structure 1100 may include, at 1102, sending, to the network, capability information to indicate that the UE is a reduced capability (RedCap) UE. The RedCap UE has reduced capability relative to a non-RedCap UE, and wherein the reduced capability is associated with at least one of: a communication bandwidth, reception branches, multiple input multiple output (MIMO) layers, a modulation order, or a duplex operation. For example, the capability information can be sent to the AMF in a registration request or to the base station in a Msg1, Msg3, or MsgA. If sent to the base station, the UE can also send the registration request to the AMF, where this registration optionally indicates the reduced capability, indicates that the UE is requesting the use of eDRX, and indicates optionally-supported eDRX values by the UE.

In an example, the operational flow/algorithmic structure 1100 may include, at 1104, receiving, from the network, one or more values for extended discontinuous reception (eDRX). The one or more values are defined for the reduced capability and are associated with at least one of: a fifth generation mobility management (5GMM)-IDLE mode or a 5GMM-CONNECTED mode with a radio resource control (RRC) inactive indication. For example, these values are defined based on extended NAS retransmission timers and/or NAS registration timers and can be stored by the network. The network (e.g., the AMF) may select from possible values based on a number of factors. These factors include the supported eDRX values by the UE (if indicated in the registration request), the number of other RedCap UEs connected to the network and using eDRX, available storage space, data priority, data time sensitivity, application type associated with data to be sent to the UE, and other factors described herein above.

In an example, the operational flow/algorithmic structure 1100 may include, at 1106, setting, from the one or more values, a value for use in an eDRX cycle occurring while the RedCap UE is in the 5GMM-IDLE mode or the 5GMM-CONNECTED mode with the RRC inactive indication. For example, the one or more values are received in configuration information from the network for the eDRX in the 5GMM-IDLE mode and in the 5GMM-CONNECTED mode with the RRC inactive indication. Upon entering an eDRX mode in the 5GMM-IDLE mode and in the 5GMM-CONNECTED mode with the RRC inactive indication, the UE uses the applicable eDRX cycle duration.

FIG. 12 illustrates another example of an operational flow/algorithmic structure 1200 for indicating reduced capability and associated eDRX cycle values, in accordance with some embodiments. The operational flows/algorithmic structure 1200 can be implemented by a network in support of a reduced capacity of a UE (e.g., a RedCap capable network such that a UE connected to the network can operate as a RedCap UE). The network can be, for example, the 5GS 108, a 5GC, an AMF, a base station, or the operational flows/algorithmic structure 1100 can be implemented by components of the network, such as one or more processors of the 5GC, AMF, and/or base station.

In an example, the operational flow/algorithmic structure 1200 may include, at 1202, receiving, from the UE, capability information indicating that the UE is a reduced capability (RedCap) UE. The RedCap UE has reduced capability relative to a non-RedCap UE, and wherein the reduced capability is associated with at least one of: a communication bandwidth, reception branches, multiple input multiple output (MIMO) layers, a modulation order, or a duplex operation. For example, the capability information can be received by the AMF in a registration request or by the base station in a Msg1, Msg3, or MsgA. If received by the base station, the AMF can also receive the REGISTRATION REQUEST message, where this registration indicates optionally indicates the reduced capability, indicates that the UE is requesting the use of eDRX, and indicates optionally supported eDRX values by the UE.

In an example, the operational flow/algorithmic structure 1200 may include, at 1206, determining one or more values for an extended discontinuous reception (eDRX) cycle. The one or more values are defined for the reduced capability and are associated with at least one of: a fifth generation mobility management (5GMM)-IDLE mode or a 5GMM-CON-NECTED mode with a radio resource control (RRC) inactive indication. For example, these values are defined based on extended NAS retransmission timers and/or NAS registration timers and can be stored by the network. The network (e.g. the AMF) may select from possible values based on a number of factors. These factors include the supported eDRX values by the UE (if indicated in the registration request), the number of other RedCap UEs connected to the network and using eDRX, available storage space, data priority, data time sensitivity, application type associated with data to be sent to the UE, and other factors described herein above.

In an example, the operational flow/algorithmic structure 1200 may include, at 1206, sending, to the UE, the one or more values. For example, the one or more values are sent to the UE to configure the eDRX for the UE in the 5GMM-IDLE mode and in the 5GMM-CONNECTED mode with the RRC inactive indication. The configuration information can be sent in a REGISTRATION ACCEPT message.

Figure 13:
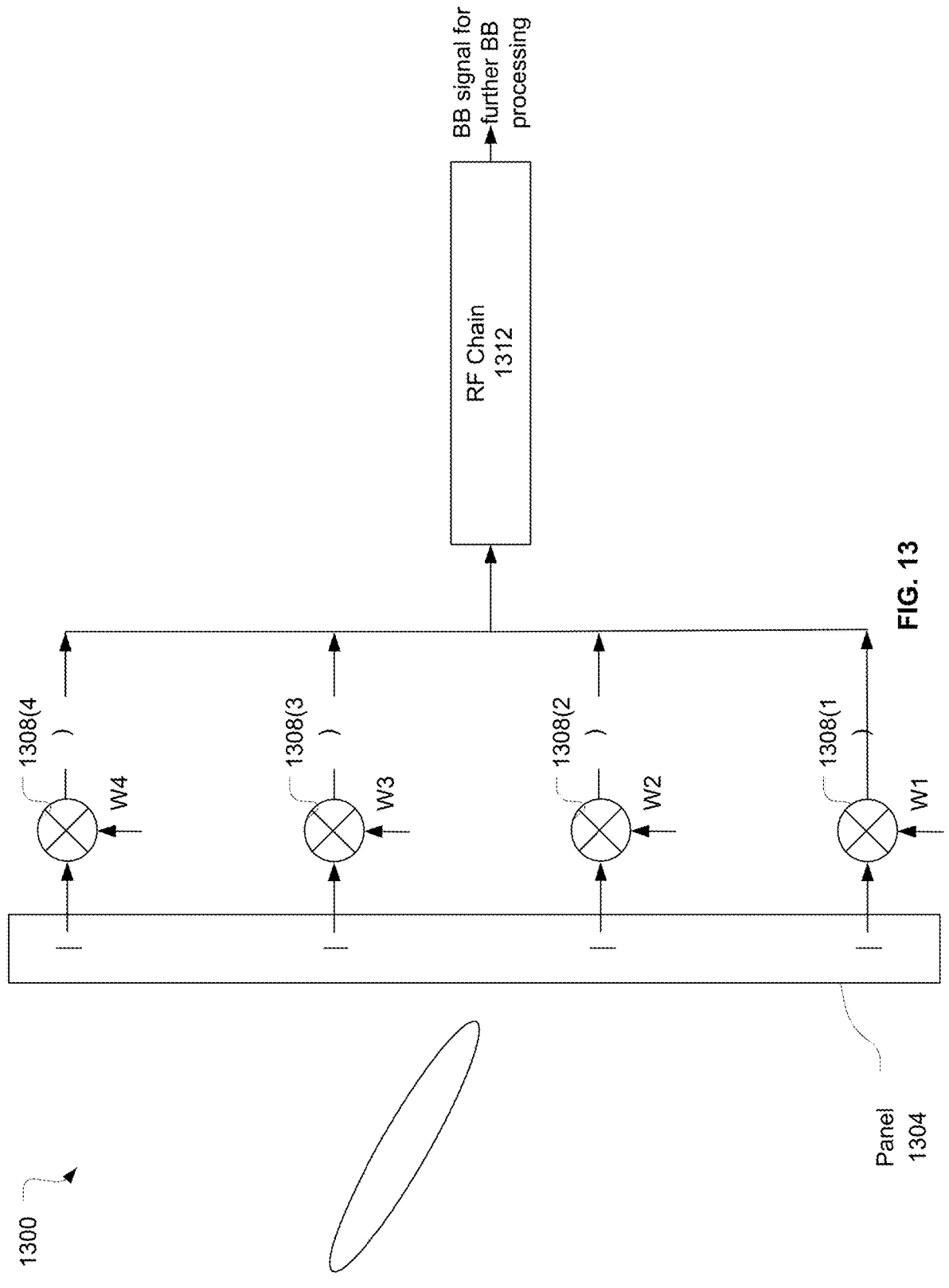
FIG. 13 illustrates an example of receive components, in accordance with some embodiments.

FIG. 13 illustrates receive components 1300 of the UE 104 in accordance with some embodiments. The receive components 1300 may include an antenna panel 1304 that includes a number of antenna elements. The panel 1304 is shown with four antenna elements, but other embodiments may include other numbers.

The antenna panel 1304 may be coupled to analog beamforming (BF) components that include a number of phase shifters 1308(1)-1308(4). The phase shifters 1308(1)-1308 (4) may be coupled with a radio-frequency (RF) chain 1312. The RF chain 1312 may amplify a receive analog RF signal, down convert the RF signal to baseband, and convert the analog baseband signal to a digital baseband signal that may be provided to a baseband processor for further processing.

In various embodiments, control circuitry, which may reside in a baseband processor, may provide BF weights (for example W1-W4), which may represent phase shift values to the phase shifters 1308(1)-1308(4) to provide a receive beam at the antenna panel 1304. These BF weights may be determined based on the channel-based beamforming.

Figure 14:
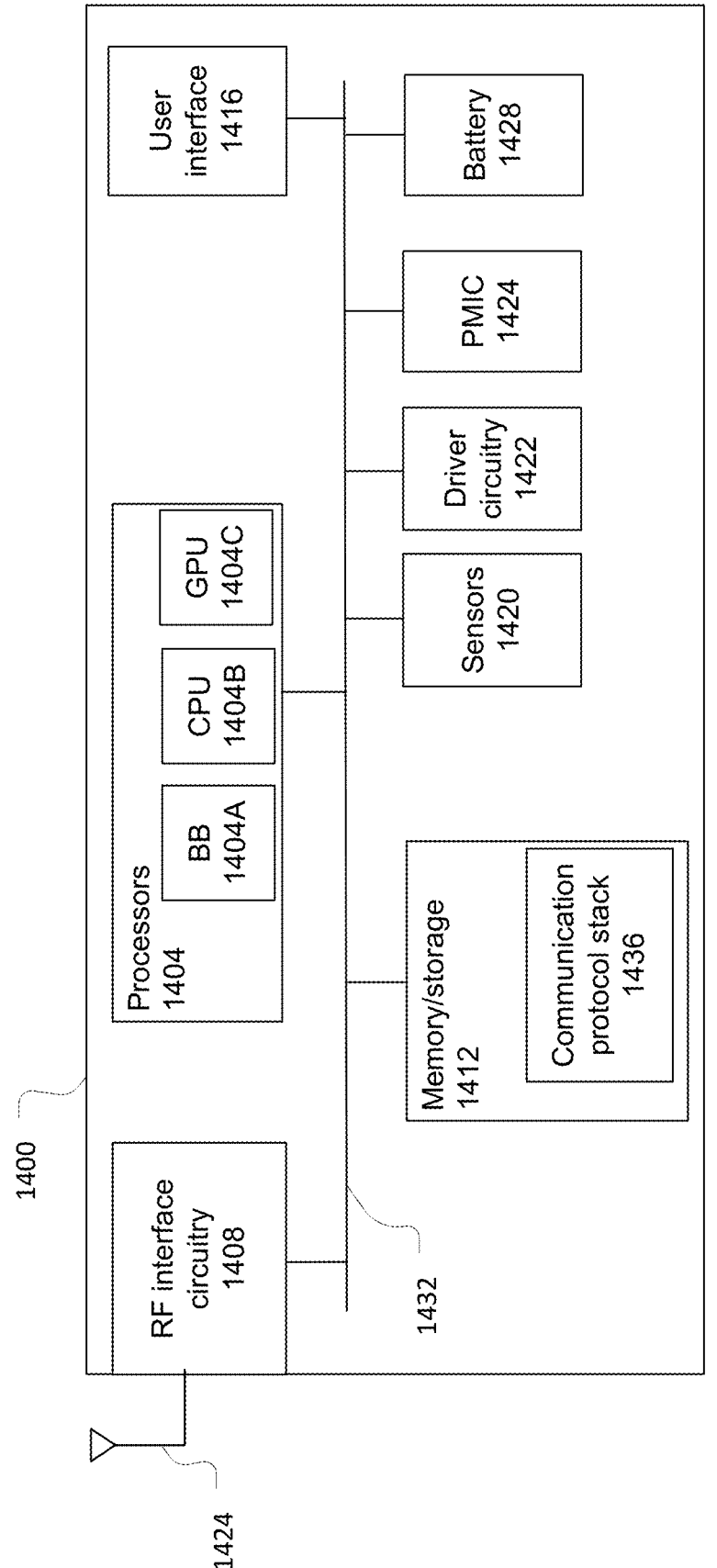
FIG. 14 illustrates an example of a UE, in accordance with some embodiments.

FIG. 14 illustrates a UE 1400 in accordance with some embodiments. The UE 1400 may be similar to and substantially interchangeable with UE 104 of FIG. 1.

Similar to that described above with respect to UE 104, the UE 1400 may be any mobile or non-mobile computing device, such as mobile phones, computers, tablets, industrial wireless sensors (for example, microphones, carbon dioxide sensors, pressure sensors, humidity sensors, thermometers, motion sensors, accelerometers, laser scanners, fluid level sensors, inventory sensors, electric voltage/current meters, and actuators), video surveillance/monitoring devices (for example, cameras, and video cameras), wearable devices, or relaxed-IoT devices. In some embodiments, the UE may be a reduced capacity UE or NR-Light UE.

The UE 1400 may include processors 1404, RF interface circuitry 1408, memory/storage 1412, user interface 1416, sensors 1420, driver circuitry 1422, power management integrated circuit (PMIC) 1424, and battery 1428. The components of the UE 1400 may be implemented as integrated circuits (ICs), portions thereof, discrete electronic devices, or other modules, logic, hardware, software, firmware, or a combination thereof. The block diagram of FIG. 14 is intended to show a high-level view of some of the components of the UE 1400. However, some of the components shown may be omitted, additional components may be present, and different arrangements of the components shown may occur in other implementations.

The components of the UE 1400 may be coupled with various other components over one or more interconnects 1432 which may represent any type of interface, input/output, bus (local, system, or expansion), transmission line, trace, optical connection, etc. that allows various circuit components (on common or different chips or chipsets) to interact with one another.

The processors 1404 may include processor circuitry, such as baseband processor circuitry (BB) 1404A, central processor unit circuitry (CPU) 1404B, and graphics processor unit circuitry (GPU) 1404C. The processors 1404 may include any type of circuitry or processor circuitry that executes or otherwise operates computer-executable instructions, such as program code, software modules, or functional processes from memory/storage 1412 to cause the UE 1400 to perform operations as described herein.

In some embodiments, the baseband processor circuitry 1404A may access a communication protocol stack 1436 in the memory/storage 1412 to communicate over a 3GPP compatible network. In general, the baseband processor circuitry 1404A may access the communication protocol stack to: perform user plane functions at a PHY layer, MAC layer, RLC layer, PDCP layer, SDAP layer, and PDU layer; and perform control-plane functions at a PHY layer, MAC layer, RLC layer, PDCP layer, RRC layer, and a non-access stratum "NAS" layer. In some embodiments, the PHY layer operations may additionally/alternatively be performed by the components of the RF interface circuitry 1408.

The baseband processor circuitry 1404A may generate or process baseband signals or waveforms that carry information in 3GPP-compatible networks. In some embodiments, the waveforms for NR may be based on cyclic prefix OFDM (CP-OFDM) in the uplink or downlink and discrete Fourier transform spread OFDM (DFT-S-OFDM) in the uplink.

The baseband processor circuitry 1404A may also access group information 1424 from memory/storage 1412 to determine search space groups in which a number of repetitions of a PDCCH may be transmitted.

The memory/storage 1412 may include any type of volatile or non-volatile memory that may be distributed throughout the UE 1400. In some embodiments, some of the memory/storage 1412 may be located on the processors 1404 themselves (for example, L1 and L2 cache), while other memory/storage 1412 is external to the processors 1404 but accessible thereto via a memory interface. The memory/storage 1412 may include any suitable volatile or non-volatile memory, such as, but not limited to, dynamic random-access memory (DRAM), static random-access memory (SRAM), erasable programmable read-only memory (EPROM), electrically erasable programmable read-only memory (EEPROM), Flash memory, solid-state memory, or any other type of memory device technology.

The RF interface circuitry 1408 may include transceiver circuitry and a radio frequency front module (RFEM) that allows the UE 1400 to communicate with other devices over a radio access network. The RF interface circuitry 1408 may include various elements arranged in transmit or receive paths. These elements may include switches, mixers, amplifiers, filters, synthesizer circuitry, control circuitry, etc.

In the receive path, the RFEM may receive a radiated signal from an air interface via an antenna 1424 and proceed to filter and amplify (with a low-noise amplifier) the signal. The signal may be provided to a receiver of the transceiver that down-converts the RF signal into a baseband signal that is provided to the baseband processor of the processors 1404.

In the transmit path, the transmitter of the transceiver up-converts the baseband signal received from the baseband processor and provides the RF signal to the RFEM. The RFEM may amplify the RF signal through a power amplifier prior to the signal being radiated across the air interface via the antenna 1424.

In various embodiments, the RF interface circuitry 1408 may be configured to transmit/receive signals in a manner compatible with NR access technologies.

The antenna 1424 may include a number of antenna elements that each convert electrical signals into radio waves to travel through the air and to convert received radio waves into electrical signals. The antenna elements may be arranged into one or more antenna panels. The antenna 1424 may have antenna panels that are omnidirectional, directional, or a combination thereof to enable beamforming and multiple input, multiple output communications. The antenna 1424 may include micro-strip antennas, printed antennas that are fabricated on the surface of one or more printed circuit boards, patch antennas, phased array antennas, etc. The antenna 1424 may have one or more panels designed for specific frequency bands including bands in FR1 or FR2.

The user interface circuitry 1416 includes various input/ output (I/O) devices designed to enable user interaction with the UE 1400. The user interface 1416 includes input device circuitry and output device circuitry. Input device circuitry includes any physical or virtual means for accepting an input including, inter alia, one or more physical or virtual buttons (for example, a reset button), a physical keyboard, keypad, mouse, touchpad, touchscreen, microphones, scanner, headset, or the like. The output device circuitry includes any physical or virtual means for showing information or otherwise conveying information, such as sensor readings, actuator position(s), or other like information. Output device circuitry may include any number or combinations of audio or visual display, including, inter alia, one or more simple visual outputs/indicators (for example, binary status indicators such as light emitting diodes (LEDs) and multi-character visual outputs, or more complex outputs such as display devices or touchscreens (for example, liquid crystal displays (LCDs), LED displays, quantum dot displays, projectors, etc.), with the output of characters, graphics, multimedia objects, and the like being generated or produced from the operation of the UE 1400.

The sensors 1420 may include devices, modules, or subsystems whose purpose is to detect events or changes in its environment and send the information (sensor data) about the detected events to some other device, module, subsystem, etc. Examples of such sensors include inter alia, inertia measurement units comprising accelerometers; gyroscopes; or magnetometers; microelectromechanical systems or nanoelectromechanical systems comprising 3-axis accelerometers; 3-axis gyroscopes; or magnetometers; level sensors; flow sensors; temperature sensors (for example, thermistors); pressure sensors; barometric pressure sensors; gravimeters; altimeters; image capture devices (for example; cameras or lens-less apertures); light detection and ranging sensors; proximity sensors (for example, infrared radiation detector and the like); depth sensors; ambient light sensors; ultrasonic transceivers; microphones or other like audio capture devices; etc.

The driver circuitry 1422 may include software and hardware elements that operate to control particular devices that are embedded in the UE 1400, attached to the UE 1400, or otherwise communicatively coupled with the UE 1400. The driver circuitry 1422 may include individual drivers allowing other components to interact with or control various input/output (I/O) devices that may be present within or connected to the UE 1400. For example, driver circuitry 1422 may include a display driver to control and allow access to a display device, a touchscreen driver to control and allow access to a touchscreen interface, sensor drivers to obtain sensor readings of sensor circuitry 1420 and control and allow access to sensor circuitry 1420, drivers to obtain actuator positions of electro-mechanic components or control and allow access to the electro-mechanic components, a camera driver to control and allow access to an embedded image capture device, or audio drivers to control and allow access to one or more audio devices.

The PMIC 1424 may manage power provided to various components of the UE 1400. In particular, with respect to the processors 1404, the PMIC 1424 may control power-source selection, voltage scaling, battery charging, or DC-to-DC conversion.

In some embodiments, the PMIC 1424 may control, or otherwise be part of, various power saving mechanisms of the UE 1400. For example, if the platform UE is in an RRC_CONNECTED state, where it is still connected to the RAN node as it expects to receive traffic shortly, then it may enter a state known as Discontinuous Reception Mode (DRX) after a period of inactivity. During this state, the UE 1400 may power down for brief intervals of time and thus save power. If there is no data traffic activity for an extended period of time, then the UE 1400 may transition off to an RRC_IDLE state, where it disconnects from the network and does not perform operations such as channel quality feedback, handover, etc. The UE 1400 goes into a very low power state and it performs paging where again, it periodically wakes up to listen to the network and then powers down again. The UE 1400 may not receive data in this state; in order to receive data, it must transition back to an RRC_CONNECTED state. An additional power saving mode may allow a device to be unavailable to the network for periods longer than a paging interval (ranging from seconds to a few hours). During this time, the device is totally unreachable to the network and may power down completely. Any data sent during this time incurs a large delay, and it is assumed that the delay is acceptable.

A battery 1428 may power the UE 1400, although in some examples the UE 1400 may be mounted deployed in a fixed location and may have a power supply coupled to an electrical grid. The battery 1428 may be a lithium-ion battery, a metal-air battery, such as a zinc-air battery, an aluminum-air battery, a lithium-air battery, and the like. In some implementations, such as in vehicle-based applications, the battery 1428 may be a typical lead-acid automotive battery.

Figure 15:
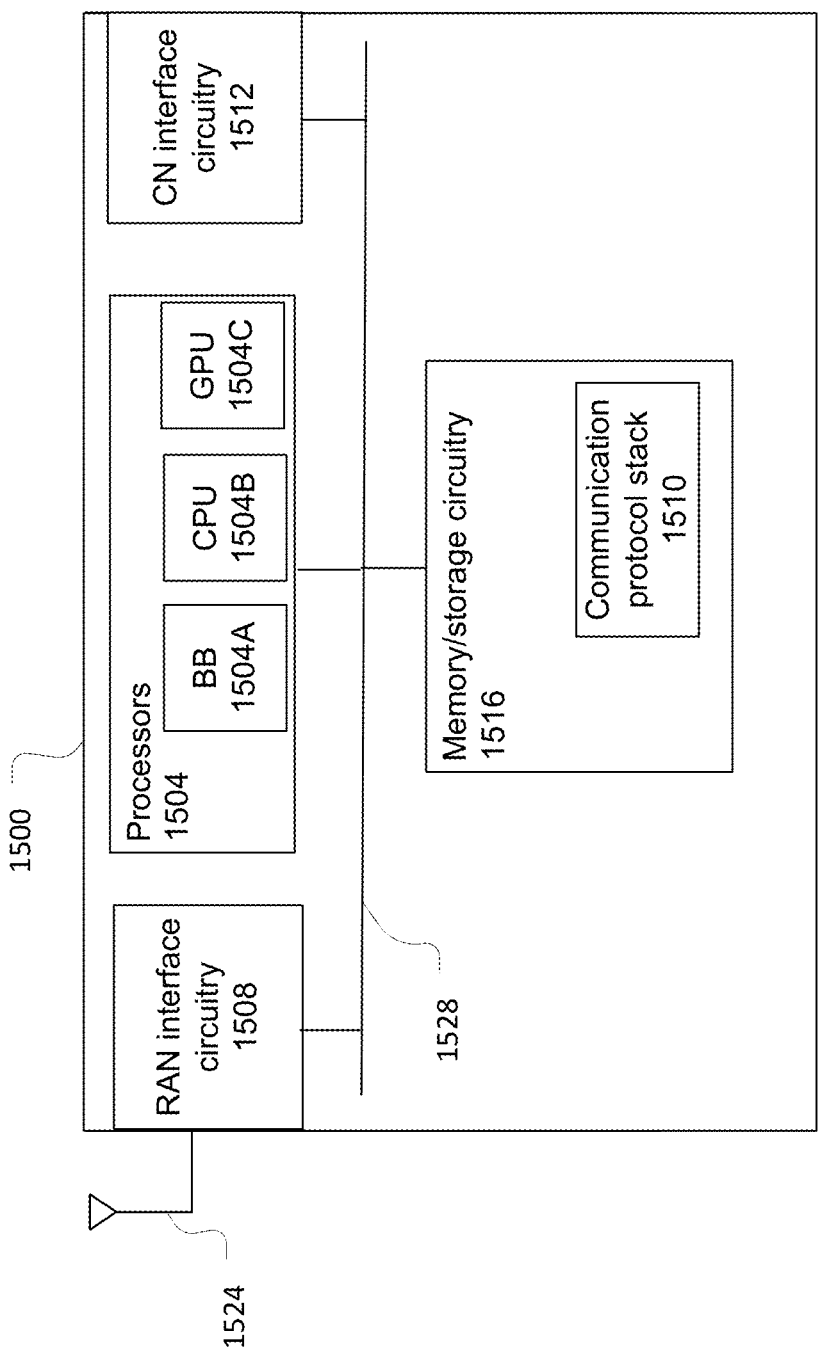
FIG. 15 illustrates an example of a base station, in accordance with some embodiments.

FIG. 15 illustrates a gNB 1500 in accordance with some embodiments. The gNB node 1500 may be similar to and substantially interchangeable with gNB 108.

The gNB 1500 may include processors 1504, RF interface circuitry 1508, core network (CN) interface circuitry 1512, and memory/storage circuitry 1516.

The components of the gNB 1500 may be coupled with various other components over one or more interconnects 1528.

The processors 1504, RF interface circuitry 1508, memory/storage circuitry 1516 (including communication protocol stack 1510), antenna 1524, and interconnects 1528 may be similar to like-named elements shown and described with respect to FIG. 13.

The CN interface circuitry 1512 may provide connectivity to a core network, for example, a $5^{th}$ Generation Core network (5GC) using a 5GC-compatible network interface protocol, such as carrier Ethernet protocols or some other suitable protocol. Network connectivity may be provided to/from the gNB 1500 via a fiber optic or wireless backhaul. The CN interface circuitry 1512 may include one or more dedicated processors or FPGAs to communicate using one or more of the aforementioned protocols. In some implementations, the CN interface circuitry 1512 may include multiple controllers to provide connectivity to other networks using the same or different protocols.

It is well-understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

For one or more embodiments, at least one of the components set forth in one or more of the preceding figures may be configured to perform one or more operations, techniques, processes, or methods as set forth in the example section below. For example, the baseband circuitry, as described above in connection with one or more of the preceding figures, may be configured to operate in accordance with one or more of the examples set forth below. For another example, circuitry associated with a UE, base station, network element, etc., as described above in connection with one or more of the preceding figures, may be configured to operate in accordance with one or more of the examples set forth below in the example section.

EXAMPLES

In the following sections, further exemplary embodiments are provided.

Example 1 includes a method implemented by a user equipment (UE), the method comprising: sending, to a network, capability information to indicate that the UE is a reduced capability (RedCap) UE, wherein the RedCap UE has reduced capability relative to a non-RedCap UE, and wherein the reduced capability is associated with at least one of: a communication bandwidth, reception branches, multiple input multiple output (MIMO) layers, a modulation order, or a duplex operation; receiving, from the network, one or more values for extended discontinuous reception (eDRX), wherein the one or more values are defined for the reduced capability and are associated with at least one of: a fifth generation mobility management (5GMM)-IDLE mode or a 5GMM-CONNECTED mode with a radio resource control (RRC) inactive indication; and setting, from the one or more values, a value for use in an eDRX cycle occurring while the RedCap UE is in the 5GMM-IDLE mode or the 5GMM-CONNECTED mode with the RRC inactive indication.

Example 2 includes a method of example 1, wherein the one or more values are defined based on a non-access stratum (NAS) timer of the UE or the network.

Example 3 includes a method of any preceding example, wherein the value is smaller than or equal to a duration that corresponds to a non-access stratum (NAS) retransmission timer multiplied by a number of NAS retransmissions.

Example 4 includes a method of any preceding example, wherein the value is a first value, and further comprising: receiving or send a message based on a non-access stratum (NAS) retransmission performed using a NAS retransmission timer, wherein the NAS retransmission timer has a second value that is defined based on the reduced capability.

Example 5 includes a method of any preceding example, wherein the value is a first value, and further comprising: performing a periodic registration procedure based on a non-access stratum (NAS) periodic registration timer, wherein the NAS periodic registration timer has a second value that is defined based on the reduced capability and that is equal to or larger than the first value.

Example 6 includes a method of any preceding example, wherein the capability information is sent in a registration request to an access and mobility management function (AMF) of the network or is sent, prior to the registration request, in a message to a base station of the network.

Example 7 includes a method of example 6, wherein the one or more values represent eDRX cycle values supported by the network, and further comprising: receiving the one or more values in a registration accept message from the AMF.

Example 8 includes a method of example 7, further comprising: sending, to the AMF, information in the registration request about eDRX cycle values supported by the UE, and wherein the one or more values are received based on the eDRX cycle values supported by the UE and the network.

Example 9 includes a method of any preceding example, further comprising: transitioning a non access stratum (NAS) layer of the UE from the 5GMM-CONNECTED mode with the RRC inactive indication to the 5GMM-CONNECTED mode and an access stratum (AS) layer of the UE from an RRC_INACTIVE state to an RRC_CONNECTED state; and receiving, from a fifth generation core (5GC) of the network, downlink data that was buffered by the 5GC for a duration corresponding to at least the value of the eDRX cycle.

Example 10 includes a method of any preceding example, further comprising: transitioning a non access stratum (NAS) layer of the UE from the 5GMM-CONNECTED mode with the RRC inactive indication to the 5GMM-CONNECTED mode and an access stratum (AS) layer of the UE from an RRC_INACTIVE state to an RRC_CONNECTED state; and receiving, from a fifth generation core (5GC) of the network or from a base station of the network, downlink data that was buffered by the 5GC or the base station for a duration corresponding to at least the value of the eDRX cycle.

Example 11 includes a method of any preceding example, further comprising: establishing a non-access stratum (NAS) connection with the network based on a registration procedure for mobility and periodic registration update (MRU); comparing a timing difference between the MRU and a start of the eDRX cycle with a timing threshold; and based on the comparing and prior to the start of the eDRX cycle, maintaining the NAS connection for a first duration or monitoring paging for a second duration.

Example 12 includes a method of any preceding example, further comprising: performing a high priority public land mobile network (HPPLMN) search, wherein at least one of a timer of the HPPLMN search is based on the value of the eDRX cycle or the HPPLMN search is synchronized with the eDRX cycle.

Example 13 includes a method of any preceding example, further comprising: performing a public land mobile network (PLMN) search; determining a first cell and a second cell based on the PLMN search; and performing a cell selection procedure, wherein the first cell is selected based on a determination that the reduced capability is supported by the first cell and unsupported by the second cell.

Example 14 includes a method of any preceding example, wherein the UE supports a first operational mode that uses the reduced capability and a second operational mode that does not use the reduced capability, and further comprising: performing a switch from operating in the first operational mode to the second operational mode; and sending, to the network, an indication about the switch.

Example 15 includes a method of example 14, wherein the indication about the switch is sent in a mobility and periodic registration update (MRU), wherein a context or a parameter of a protocol data unit (PDU) session applicable prior to the switch remains the same after the switch.

Example 16 includes a method implemented by a network, the method comprising: receiving, from a user equipment (UE), capability information indicating that the UE is a reduced capability (RedCap) UE, wherein the RedCap UE has reduced capability relative to a non-RedCap UE, and wherein the reduced capability is associated with at least one of: a communication bandwidth, reception branches, multiple input multiple output (MIMO) layers, a modulation order, or a duplex operation; determining one or more values for an extended discontinuous reception (eDRX) cycle, wherein the one or more values are defined for the reduced capability and are associated with at least one of: a fifth generation mobility management (5GMM)-IDLE mode or a 5GMM-CONNECTED mode with a radio resource control (RRC) inactive indication; and sending, to the UE, the one or more values.

Example 17 includes a method of example 16, wherein the capability information is received by an access and mobility management function (AMF) of the network in a REGISTRATION REQUEST message from the UE or is received by a base station of the network in another message from the UE and is sent by the base station to the AMF.

Example 18 includes a method of example 17, wherein the one or more values are sent by the AMF to the UE in a REGISTRATION ACCEPT message, and wherein the method further comprises: sending, by the AMF, to the base station, the one or more values in an N2 interface message.

Example 19 includes a method of any preceding example 16-18, further comprising: determining that a non-access stratum (NAS) layer of the UE is in the 5GMM-IDLE mode; and buffering, by a fifth generation core (5GC) of the network and for a duration that corresponds to at least the eDRX cycle, data for a user plane function (UPF) session or a session management function (SMF) session with the UE.

Example 20 includes a method of any preceding example 16-19, further comprising: determining that the NAS layer is in the 5GMM-CONNECTED mode with the inactive indication and an access stratum (AS) layer of the UE is in an RRC_INACTIVE state; and buffering, by fifth generation core (5GC) of the network or by a first base station of the network and for a duration that corresponds to at least the eDRX cycle, data for a user plane function (UPF) session or a session management function (SMF) session with the UE.

Example 21 includes a method of any example 20, wherein the data is buffered by the first base station, and further comprising: sending, by the first base station to a second base station, the data based on a cell change of the UE.

Example 22 includes a method of any preceding example 16-21, further comprising: performing a paging procedure by using a fifth generation (5G) global unique temporary identifier (GUTI), wherein the 5G GUTI is re-usable for a plurality of paging procedures or is changed based on a signaling message from the UE or a mobility and periodic registration update (MRU) from the UE.

Example 23 includes a method of any preceding examples 16-22, wherein the UE supports a first operational mode that uses the reduced capability and a second operational mode that does not use the reduced capability, and wherein the method further comprises: receiving, from the UE, an indication about a switch from operating in the first operational mode to the second operational mode; and using, after the switch, a context or a parameter of a protocol data unit (PDU) session with the UE, wherein the context or the parameter was used prior to the switch.

Example 24 includes a UE comprising means to perform one or more elements of a method described in or related to any of the examples 1-15.

Example 25 includes one or more non-transitory computer-readable media comprising instructions to cause a UE, upon execution of the instructions by one or more processors of the UE, to perform one or more elements of a method described in or related to any of the examples 1-15.

Example 26 includes a UE comprising logic, modules, or circuitry to perform one or more elements of a method described in or related to any of the examples 1-15.

Example 27 includes a UE comprising: one or more processors and one or more computer-readable media comprising instructions that, when executed by the one or more processors, cause the one or more processors to perform one or more elements of a method described in or related to any of the examples 1-15.

Example 28 includes a system comprising means to perform one or more elements of a method described in or related to any of the examples 1-15.

Example 29 includes a network comprising means to perform one or more elements of a method described in or related to any of the examples 16-23.

Example 30 includes one or more non-transitory computer-readable media comprising instructions to cause a network, upon execution of the instructions by one or more processors of the network, to perform one or more elements of a method described in or related to any of the examples 16-23.

Example 31 includes a network comprising logic, modules, or circuitry to perform one or more elements of a method described in or related to any of the examples 16-23.

Example 32 includes a network comprising: one or more processors and one or more computer-readable media comprising instructions that, when executed by the one or more processors, cause the one or more processors to perform one or more elements of a method described in or related to any of the examples 16-23.

Example 33 includes a system comprising means to perform one or more elements of a method described in or related to any of the examples 16-23.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Although the embodiments above have been described in considerable detail, numerous variations and modifications will become apparent to those skilled in the art once the above disclosure is fully appreciated. It is intended that the following claims be interpreted to embrace all such variations and modifications.

Applicant hereby claims:

1. An apparatus comprising:
processing circuitry configured to:
   generate, for transmission to a network, capability information indicating that a user equipment (UE) is a reduced capability (RedCap) UE, wherein the RedCap UE has reduced capability relative to a non-RedCap UE, and wherein the reduced capability is associated with at least one of: a communication bandwidth, reception branches, multiple input multiple output (MIMO) layers, a modulation order, or a duplex operation;
   determine one or more values for extended discontinuous reception (eDRX), wherein the one or more values are received from the network, are defined for the reduced capability, and are associated with at least one of: a fifth generation mobility management (5GMM)-IDLE mode or a 5GMM-CONNECTED mode with a radio resource control (RRC) inactive indication, wherein the 5GMM-IDLE mode and the 5GMM-CONNECTED mode with RRC inactive indication are non-access stratum (NAS) layer mobility management modes; and
   set, from the one or more values, a value for use in an eDRX cycle occurring while the RedCap UE is in the 5GMM-IDLE mode or the 5GMM-CONNECTED mode with the RRC inactive indication.

2. The apparatus of claim 1, wherein the one or more values are defined based on a NAS timer of the RedCap UE or the network.

3. The apparatus of claim 1, wherein the value is smaller than or equal to a duration that corresponds to a NAS retransmission timer multiplied by a number of NAS retransmissions.

4. The apparatus of claim 1, wherein the value is a first value, wherein the processing circuitry is further configured to:
   process a message based on a NAS retransmission performed using a NAS retransmission timer, wherein the NAS retransmission timer has a second value that is defined based on the reduced capability.

5. The apparatus of claim 1, wherein the value is a first value, wherein the processing circuitry is further configured to:
   perform a periodic registration procedure based on a NAS periodic registration timer, wherein the NAS periodic registration timer has a second value that is defined based on the reduced capability and that is equal to or larger than the first value.

6. The apparatus of claim 1, wherein the capability information is sent in a registration request to an access and mobility management function (AMF) of the network or is sent, prior to the registration request, in a message to a base station of the network.

7. The apparatus of claim 1, wherein the processing circuitry is further configured to:
   transition a NAS layer of the RedCap UE from the 5GMM-CONNECTED mode with the RRC inactive indication to the 5GMM-CONNECTED mode and an access stratum (AS) layer of the RedCap UE from an RRC_INACTIVE state to an RRC_CONNECTED state; and
   receive, from a fifth generation core (5GC) of the network, downlink data that was buffered by the 5GC for a duration corresponding to at least the value of the eDRX cycle.

8. The apparatus of claim 1, wherein the processing circuitry is further configured to:
   transition a NAS layer of the RedCap UE from the 5GMM-CONNECTED mode with the RRC inactive indication to the 5GMM-CONNECTED mode and an access stratum (AS) layer of the RedCap UE from an RRC_INACTIVE state to an RRC_CONNECTED state; and
   process downlink data that is received from a fifth generation core (5GC) of the network or from a base station of the network, wherein the downlink data was buffered by the 5GC or the base station for a duration corresponding to at least the value of the eDRX cycle.

9. One or more non-transitory computer-readable media storing instructions that, upon execution on a user equipment (UE), cause the UE to perform operations comprising:
   generating, for transmission to a network, capability information to indicate that the UE is a reduced capability (RedCap) UE, wherein the RedCap UE has reduced capability relative to a non-RedCap UE, and wherein the reduced capability is associated with at least one of: a communication bandwidth, reception branches, multiple input multiple output (MIMO) layers, a modulation order, or a duplex operation;
   processing one or more values for extended discontinuous reception (eDRX), wherein the one or more values are received from the network, are defined for the reduced capability, and are associated with at least one of: a fifth generation mobility management (5GMM)-IDLE mode or a 5GMM-CONNECTED mode with a radio resource control (RRC) inactive indication, wherein the 5GMM-IDLE mode and the 5GMM-CONNECTED mode with RRC inactive indication are non-access stratum (NAS) layer mobility management modes; and
   setting, from the one or more values, a value for use in an eDRX cycle occurring while the RedCap UE is in the 5GMM-IDLE mode or the 5GMM-CONNECTED mode with the RRC inactive indication.

10. The one or more non-transitory computer-readable media of claim 9, wherein the operations further comprise:
   establishing a NAS connection with the network based on a registration procedure for mobility and periodic registration update (MRU);
   comparing a timing difference between the MRU and a start of the eDRX cycle with a timing threshold; and
   based on the comparing and prior to the start of the eDRX cycle, maintaining the NAS connection for a first duration or monitoring paging for a second duration.

11. The one or more non-transitory computer-readable media of claim 9, wherein the operations further comprise:
   performing a high priority public land mobile network (HPPLMN) search, wherein at least one of a timer of the HPPLMN search is based on the value of the eDRX cycle or the HPPLMN search is synchronized with the eDRX cycle.

12. The one or more non-transitory computer-readable media of claim 9, wherein the operations further comprise:

determining, during a public land mobile network (PLMN) selection procedure or a cell selection procedure, that at least one of a network or a cell provides a support for reduced capability user equipment operation, wherein the support is determined from a system information block (SIB); and selecting the at least one of the network or the cell for registration based on the support for the reduced capability user equipment operation.

13. The one or more non-transitory computer-readable media of claim 9, wherein the UE supports a first operational mode that uses the reduced capability and a second operational mode that does not use the reduced capability, and wherein the operations further comprise:

performing a switch from operating in the first operational mode to the second operational mode; and generating, for transmission to the network, an indication about the switch.

14. A method implemented on a network comprising:

processing capability information received from a user equipment (UE) and indicating that the UE is a reduced capability (RedCap) UE, wherein the RedCap UE has reduced capability relative to a non-RedCap UE, and wherein the reduced capability is associated with at least one of: a communication bandwidth, reception branches, multiple input multiple output (MIMO) layers, a modulation order, or a duplex operation;

determining one or more values for an extended discontinuous reception (eDRX) cycle, wherein the one or more values are defined for the reduced capability and are associated with at least one of: a fifth generation mobility management (5GMM)-IDLE mode or a 5GMM-CONNECTED mode with a radio resource control (RRC) inactive indication, wherein the 5GMM-IDLE mode and the 5GMM-CONNECTED mode with RRC inactive indication are non-access stratum (NAS) layer mobility management modes; and sending, to the UE, the one or more values.

15. The method of claim 14, wherein the capability information is received by an access and mobility management function (AMF) of the network in a REGISTRATION REQUEST message from the UE or is received by a base station of the network in another message from the UE and is sent by the base station to the AMF.

16. The method of claim 15, wherein the one or more values are sent by the AMF to the UE in a REGISTRATION ACCEPT message, and wherein the method further comprises: sending, by the AMF, to the base station, the one or more values in an N2 interface message.

17. The method of claim 14, further comprising:

determining that a NAS layer of the UE is in the 5GMM-IDLE mode; and buffering, by a fifth generation core (5GC) of a network and for a duration that corresponds to at least the eDRX cycle, data for a user plane function (UPF) session or a session management function (SMF) session with the UE.

18. The method of claim 14, further comprising:

determining that a non-access stratum (NAS) layer is in the 5GMM-CONNECTED mode with the inactive indication and an access stratum (AS) layer of the UE is in an RRC_INACTIVE state; and buffering, by fifth generation core (5GC) of the network or by a first base station of the network and for a duration that corresponds to at least the eDRX cycle, data for a user plane function (UPF) session or a session management function (SMF) session with the UE.

19. The method of claim 14, further comprising:

performing a paging procedure by using a fifth generation (5G) global unique temporary identifier (GUTI), wherein the 5G GUTI is re-usable for a plurality of paging procedures or is changed based on a signaling message from the UE or a mobility and periodic registration update (MRU) from the UE.

20. The method of claim 14, wherein the UE supports a first operational mode that uses the reduced capability and a second operational mode that does not use the reduced capability, and wherein the method further comprises:

receiving, from the UE, an indication about a switch from operating in the first operational mode to the second operational mode; and using, after the switch, a context or a parameter of a protocol data unit (PDU) session with the UE, wherein the context or the parameter was used prior to the switch.

* * * * *